US010909563B1

(12) United States Patent
Aaron et al.

(10) Patent No.: US 10,909,563 B1
(45) Date of Patent: Feb. 2, 2021

(54) GENERATION AND TRACKING OF REFERRALS IN RECEIPTS

(71) Applicant: Square, Inc., San Francisco, CA (US)

(72) Inventors: Paul Aaron, San Francisco, CA (US); Keisuke Omi, San Francisco, CA (US); Merrill Lutsky, San Francisco, CA (US); Hillary Prather, Seattle, WA (US); Nathan McCauley, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/980,653

(22) Filed: May 15, 2018

Related U.S. Application Data

(63) Continuation of application No. 14/529,024, filed on Oct. 30, 2014, now abandoned.

(51) Int. Cl.
*G06Q 30/02* (2012.01)
(52) U.S. Cl.
CPC ..... *G06Q 30/0215* (2013.01); *G06Q 30/0214* (2013.01)
(58) Field of Classification Search
CPC .............. G06Q 30/0215; G06Q 30/0214
USPC ....................................... 705/14.16
See application file for complete search history.

(56) References Cited

U.S. PATENT DOCUMENTS

| | | | |
|---|---|---|---|
| 5,774,868 A | 6/1998 | Cragun et al. | |
| 5,878,337 A | 3/1999 | Joao et al. | |
| 6,092,178 A | 7/2000 | Jindal et al. | |
| 6,292,786 B1 | 9/2001 | Deaton et al. | |
| 6,484,182 B1 | 11/2002 | Dunphy et al. | |
| 6,694,300 B1 | 2/2004 | Walker et al. | |
| 7,555,444 B1 | 6/2009 | Wilson et al. | |
| 7,587,502 B2 | 9/2009 | Crawford et al. | |
| 7,711,586 B2 | 5/2010 | Aggarwal et al. | |
| 7,764,185 B1 | 7/2010 | Manz et al. | |

(Continued)

FOREIGN PATENT DOCUMENTS

| | | | |
|---|---|---|---|
| CA | 3 019 369 A1 | 10/2017 | |
| WO | WO-2004097579 A2 * | 11/2004 | ............. G06Q 30/02 |

(Continued)

OTHER PUBLICATIONS

Tejal K. Gandhi, Advances in Patient Safety: New Directions and Alternative Approaches, 2008 (Year: 2008).*

(Continued)

*Primary Examiner* — Tarek Elchanti
(74) *Attorney, Agent, or Firm* — Lee & Hayes, P.C.

(57) ABSTRACT

Introduced is a technology for facilitating a referral between a referrer and a referee, including the generation of the referral and the tracking of the referral redemption by the referee. The technology enables a customer to send a referral about a merchant to a friend by simply providing contact information associated with that friend (e.g., email address, telephone number, etc.), and further enables the friend to redeem a promotional offer included in the referral upon a use of the friend's payment card at the merchant's point-of-sale (POS) system, without having to provide any further information. In some instances, a transfer of a referral reward (e.g., points, discount, payment, etc.) is also transferred to the referrer in response to the redemption by the referee.

20 Claims, 9 Drawing Sheets

(56) References Cited

U.S. PATENT DOCUMENTS

| | | | |
|---|---|---|---|
| 7,810,729 B2 | 10/2010 | Morley, Jr. |
| 8,935,777 B2 | 1/2015 | DeSoto et al. |
| 9,082,052 B2 | 7/2015 | Rodriguez et al. |
| 9,280,515 B2 | 3/2016 | Gaede et al. |
| 9,633,344 B2 | 4/2017 | Nathanel et al. |
| 9,665,858 B1 | 5/2017 | Kumar |
| 2001/0037205 A1 | 11/2001 | Joao |
| 2001/0051914 A1 | 12/2001 | Yoon et al. |
| 2002/0038246 A1 | 3/2002 | Nagaishi et al. |
| 2002/0160817 A1 | 10/2002 | Salmimaa et al. |
| 2002/0178060 A1 | 11/2002 | Sheehan |
| 2003/0074328 A1 | 4/2003 | Schiff et al. |
| 2003/0101454 A1 | 5/2003 | Ozer et al. |
| 2003/0171096 A1 | 9/2003 | Ilan et al. |
| 2003/0200108 A1 | 10/2003 | Malnoe |
| 2003/0204447 A1 | 10/2003 | Dalzell et al. |
| 2004/0034570 A1 | 2/2004 | Davis |
| 2004/0103022 A1 | 5/2004 | Chilcoat, III et al. |
| 2004/0127256 A1 | 7/2004 | Goldthwaite et al. |
| 2004/0197489 A1 | 10/2004 | Heuser et al. |
| 2004/0236671 A1 | 11/2004 | Woodruff et al. |
| 2004/0260607 A1 | 12/2004 | Robbins et al. |
| 2005/0015299 A1 | 1/2005 | Sisserian |
| 2005/0171845 A1 | 8/2005 | Halfman et al. |
| 2005/0222910 A1 | 10/2005 | Wills |
| 2005/0273440 A1 | 12/2005 | Ching |
| 2005/0277405 A1 | 12/2005 | Noguchi |
| 2006/0004598 A1 | 1/2006 | Boyd et al. |
| 2006/0085333 A1 | 4/2006 | Wah et al. |
| 2006/0178932 A1 | 8/2006 | Lang |
| 2006/0212355 A1 | 9/2006 | Teague et al. |
| 2007/0150588 A1 | 6/2007 | Ghadialy et al. |
| 2007/0156513 A1 | 7/2007 | Mastrianni et al. |
| 2007/0179836 A1 | 8/2007 | Juang et al. |
| 2007/0192182 A1 | 8/2007 | Monaco et al. |
| 2007/0221728 A1 | 9/2007 | Ferro et al. |
| 2008/0133340 A1 | 6/2008 | Do et al. |
| 2008/0133351 A1 | 6/2008 | White et al. |
| 2008/0177624 A9 | 7/2008 | Dohse |
| 2008/0197188 A1 | 8/2008 | Jagatic et al. |
| 2008/0201224 A1 | 8/2008 | Owens et al. |
| 2008/0201226 A1 | 8/2008 | Carlson et al. |
| 2008/0208688 A1 | 8/2008 | Byerley et al. |
| 2008/0255947 A1 | 10/2008 | Friedman |
| 2008/0262925 A1 | 10/2008 | Kim et al. |
| 2008/0277465 A1 | 11/2008 | Pletz et al. |
| 2008/0283590 A1 | 11/2008 | Oder, II et al. |
| 2009/0016568 A1 | 1/2009 | Kamijoh et al. |
| 2009/0112766 A1 | 4/2009 | Hammad et al. |
| 2009/0125429 A1 | 5/2009 | Takayama |
| 2009/0248578 A1 | 10/2009 | Pollock et al. |
| 2010/0057661 A1 | 3/2010 | Otto et al. |
| 2010/0082420 A1 | 4/2010 | Trifiletti et al. |
| 2010/0082468 A1 | 4/2010 | Low et al. |
| 2010/0082487 A1 | 4/2010 | Nelsen |
| 2010/0174596 A1 | 7/2010 | Gilman et al. |
| 2010/0223145 A1 | 9/2010 | Dragt |
| 2010/0257040 A1 | 10/2010 | Hunt |
| 2010/0269059 A1 | 10/2010 | Olthmeret al. |
| 2010/0306040 A1 | 12/2010 | Arumugam et al. |
| 2011/0024495 A1 | 2/2011 | Anderson |
| 2011/0029370 A1 | 2/2011 | Roeding et al. |
| 2011/0071892 A1 | 3/2011 | Dickelman |
| 2011/0106597 A1 | 5/2011 | Ferdman et al. |
| 2011/0137928 A1 | 6/2011 | Engle et al. |
| 2011/0178862 A1 | 7/2011 | Daigle |
| 2011/0178883 A1 | 7/2011 | Granbery et al. |
| 2011/0210170 A1 | 9/2011 | Arguello |
| 2011/0246284 A1 | 10/2011 | Chaikin et al. |
| 2011/0251888 A1 | 10/2011 | Faith et al. |
| 2011/0251892 A1 | 10/2011 | Laracey |
| 2011/0264501 A1 | 10/2011 | Clyne |
| 2011/0302080 A1 | 12/2011 | White et al. |
| 2011/0320345 A1 | 12/2011 | Taveau et al. |
| 2012/0016731 A1 | 1/2012 | Smith et al. |
| 2012/0059701 A1 | 3/2012 | van der Veen et al. |
| 2012/0131094 A1 | 5/2012 | Lyons et al. |
| 2012/0185318 A1 | 7/2012 | Shipley |
| 2012/0185322 A1 | 7/2012 | Shipley |
| 2012/0221446 A1 | 8/2012 | Grigg et al. |
| 2012/0282893 A1 | 11/2012 | Kim et al. |
| 2013/0030889 A1 | 1/2013 | Davich et al. |
| 2013/0041811 A1 | 2/2013 | Vazquez et al. |
| 2013/0060641 A1 | 3/2013 | Al Gharabally |
| 2013/0073371 A1 | 3/2013 | Bosworth et al. |
| 2013/0091001 A1 | 4/2013 | Jia et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0144715 A1 | 6/2013 | Kranzley et al. |
| 2013/0151344 A1 | 6/2013 | Tavares et al. |
| 2013/0173366 A1 | 7/2013 | Beighley, Jr. |
| 2013/0197980 A1 | 8/2013 | Lerner et al. |
| 2013/0218670 A1 | 8/2013 | Spears |
| 2013/0246207 A1 | 9/2013 | Novak et al. |
| 2013/0246301 A1 | 9/2013 | Radhakrishnan et al. |
| 2013/0268431 A1 | 10/2013 | Mohsenzadeh |
| 2013/0297446 A1 | 11/2013 | Nagarajan et al. |
| 2014/0019256 A1 | 1/2014 | Argue et al. |
| 2014/0032283 A1 | 1/2014 | Bradford |
| 2014/0040007 A1 | 2/2014 | Relyea, Jr. et al. |
| 2014/0046742 A1 | 2/2014 | Goodman |
| 2014/0129135 A1 | 5/2014 | Holden et al. |
| 2014/0129302 A1 | 5/2014 | Amin et al. |
| 2014/0129357 A1 | 5/2014 | Goodwin |
| 2014/0129951 A1 | 5/2014 | Amin et al. |
| 2014/0180805 A1 | 6/2014 | Argue et al. |
| 2014/0207669 A1 | 7/2014 | Rosenberg |
| 2014/0351130 A1 | 11/2014 | Cheek et al. |
| 2014/0358655 A1 | 12/2014 | Wheeler |
| 2015/0039413 A1 | 2/2015 | Winkler |
| 2015/0073907 A1 | 3/2015 | Purves et al. |
| 2015/0095141 A1 | 4/2015 | Razdan et al. |
| 2015/0120411 A1 | 4/2015 | Kneen |
| 2015/0142544 A1 | 5/2015 | Tietzen et al. |
| 2015/0178750 A1 | 6/2015 | Robinson |
| 2016/0171540 A1 | 6/2016 | Mangipudi et al. |
| 2016/0203497 A1 | 7/2016 | Tietzen et al. |
| 2017/0286989 A1 | 10/2017 | Zigoris et al. |
| 2017/0287001 A1 | 10/2017 | Zigoris et al. |
| 2017/0372434 A1 | 12/2017 | Winters |

FOREIGN PATENT DOCUMENTS

| | | |
|---|---|---|
| WO | 2013/015746 A2 | 1/2013 |
| WO | 2013/184844 A2 | 12/2013 |
| WO | 2017/172967 A1 | 10/2017 |

OTHER PUBLICATIONS

"Munson, J., and Gupta, V.K., ""Location-Based Notification as a General-Purpose Service,"" dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44".

"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.

"Online Shopping," dated Nov. 2, 2014, Retrieved from the Internet URL: http://en.wikipedia.org/wiki/Online_shopping, on Nov. 10, 2014, pp. 1-12.

"Payment Gateway," Wikipedia, published May 30, 2014, Retrieved from the Internet URL: http://en.wikipedia.org/wiki/Payment gateways, on Jun. 6, 2014, pp. 1-3.

"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

(56) References Cited

OTHER PUBLICATIONS

Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Non-Final Office Action dated Jun. 24, 2015, for U.S. Appl. No. 14/575,306, of Wagner, D.R., et al., filed Dec. 18, 2014.
Final Office Action dated Feb. 9, 2016, for U.S. Appl. No. 14/575,306, of Wagner, D.R., et al., filed Dec. 18, 2014.
Advisory Action dated May 6, 2016, for U.S. Appl. No. 14/575,306, of Wagner, D.R., et al., filed Dec. 18, 2014.
Non-Final Office Action dated Jun. 20, 2016, for U.S. Appl. No. 14/575,306, of Wagner, D.R., et al., filed Dec. 18, 2014.
Non-Final Office Action dated Nov. 7, 2016, for U.S. Appl. No. 14/575,306, of Wagner, D.R., et al., filed Dec. 18, 2014.
Final Office Action dated Jun. 1, 2017, for U.S. Appl. No. 14/575,306, of Wagner, D.R., et al., filed Dec. 18, 2014.
Non-Final Office Action dated Mar. 7, 2018, for U.S. Appl. No. 14/575,306, of Wagner, D.R., et al., filed Dec. 18, 2014.
Non-Final Office Action dated Nov. 28, 2018, for U.S. Appl. No. 15/087,804, of Zigoris, P., filed Mar. 31, 2016.
Non-Final Office Action dated Jan. 25, 2019, for U.S. Appl. No. 15/087,774, of Zigoris, P., filed Mar. 31, 2016.
Final Office Action dated Feb. 4, 2019, for U.S. Appl. No. 15/194,250, of Qi, Y., et al., filed Jun. 27, 2016.
Final Office Action dated Feb. 28, 2019, for U.S. Appl. No. 14/575,306, of Wagner, D.R., et al., filed Dec. 18, 2014.
Non-Final Office Action dated Mar. 29, 2019, for U.S. Appl. No. 14/482,948, of Brock, Z., et al., filed Sep. 10, 2014.
Final Office Action dated Apr. 3, 2019, for U.S. Appl. No. 15/087,804, of Zigoris, P., et al., filed Mar. 31, 2016.
Advisory Action dated Apr. 15, 2019, for U.S. Appl. No. 15/194,250, of Qi, Y., et al., filed Jun. 27, 2016.
Non-Final Office Action dated Jun. 19, 2015, for U.S. Appl. No. 14/529,024, of Aaron, P., et al., filed Oct. 30, 2014.
Non-Final Office Action dated Jul. 1, 2015, for U.S. Appl. No. 13/949,172, of Abrons, A., filed Jul. 23, 2013.
Non-Final Office Action dated Nov. 17, 2015, for U.S. Appl. No. 14/529,024, of Aaron, P., et al., filed Oct. 30, 2014.
Final Office Action dated Dec. 4, 2015, for U.S. Appl. No. 13/949,172, of Abrons, A., filed Jul. 23, 2013.
Final Office Action dated Mar. 11, 2016, for U.S. Appl. No. 14/529,024, of Aaron, P., et al., filed Oct. 30, 2014.
Non-Final Office Action dated May 3, 2016, for U.S. Appl. No. 13/830,350, of Morgan, T.B., et al., filed Mar. 14, 2013.
Non-Final Office Action dated Jun. 17, 2016, for U.S. Appl. No. 13/949,172, of Abrons, A., filed Jul. 23, 2013.
Non-Final Office Action dated Jul. 5, 2016, for U.S. Appl. No. 14/529,024, of Aaron, P., et al., filed Oct. 30, 2014.
Final Office Action dated Oct. 20, 2016, for U.S. Appl. No. 14/529,024, of Aaron, P., et al., filed Oct. 30, 2014.
Final Office Action dated Nov. 10, 2016, for U.S. Appl. No. 13/830,350, of Morgan, T.B., et al., filed Mar. 14, 2013.
Final Office Action dated Nov. 15, 2016, for U.S. Appl. No. 13/949,172, of Abrons, A., filed Jul. 23, 2013.
Advisory Action dated Jan. 26, 2017, for U.S. Appl. No. 13/949,172, of Abrons, A., filed Jul. 23, 2013.
Advisory Action dated Jan. 30, 2017, for U.S. Appl. No. 14/529,024, of Aaron, P., et al., filed Oct. 30, 2014.
Non-Final Office Action dated Jul. 10, 2017, for U.S. Appl. No. 13/830,350, of Morgan, T.B., et al., filed Mar. 14, 2013.
Non-Final Office Action dated Jul. 10, 2017, for U.S. Appl. No. 14/482,948, of Brock, Z., et al., filed Sep. 10, 2014.
Non-Final Office Action dated Jul. 27, 2017, for U.S. Appl. No. 14/529,024, of Aaron, P., et al., filed Oct. 30, 2014.
Non-Final Office Action dated Sep. 13, 2017, for U.S. Appl. No. 13/949,172, of Abrons, A., filed Jul. 23, 2013.
Final Office Action dated Nov. 16, 2017, for U.S. Appl. No. 14/529,024, of Aaron, P., et al., filed Oct. 30, 2014.
Final Office Action dated Jan. 2, 2018, for U.S. Appl. No. 14/482,948, of Brock, Z., et al., filed Sep. 10, 2014.
Final Office Action dated Jan. 22, 2018, for U.S. Appl. No. 13/830,350, of Morgan, T.B., et al., filed Mar. 14, 2013.
Final Office Action dated Feb. 14, 2018, for U.S. Appl. No. 13/949,172, of Abrons, A., filed Jul. 23, 2013.
Non-Final Office Action dated Jun. 15, 2018, for U.S. Appl. No. 15/194,250, of Qi, Y., et al., filed Jun. 27, 2016.
Non-Final Office Action dated Jun. 26, 2018, for U.S. Appl. No. 15/087,804, of Zigoris, P., et al., filed Mar. 31, 2016.
Non-Final Office Action dated Aug. 6, 2018, for U.S. Appl. No. 13/830,350, of Morgan, T.B., et al., filed Mar. 14, 2013.
International Search Report and Written Opinion for International Application No. PCT/US2017/024824, dated May 31, 2017.
Advisory Action dated Jun. 19, 2019, for U.S. Appl. No. 15/087,804, of Zigoris, P., et al., filed Mar. 31, 2016.
Final Office Action dated Aug. 6, 2019, for U.S. Appl. No. 15/087,774, of Zigoris, P., et al., filed Mar. 31, 2016.
Non-Final Office Action dated Aug. 20, 2019, for U.S. Appl. No. 15/087,804, of Zigoris, P., et al., filed Mar. 31, 2016.
Non-Final Office Action dated Sep. 17, 2019, for U.S. Appl. No. 15/194,250, of Qi, Y., et al., filed Jun. 27, 2016.
Office Action dated Sep. 17, 2019, in Canadian Patent Application No. 3,019,369 of Zigoris, P., et al.
Non-Final Office Action dated Dec. 5, 2019, for U.S. Appl. No. 15/087,774, of Zigoris, P., et al., filed Mar. 31, 2016.
Notice of Allowance dated Jun. 24, 2020, for U.S. Appl. No. 15/194,250, of Qi, Y., et al., filed Jun. 27, 2016.
Notice of Allowance dated Feb. 4, 2020, for U.S. Appl. No. 14/482,948, of Brock, Z., et al., filed Sep. 10, 2014.
Final Office Action dated Feb. 20, 2020, for U.S. Appl. No. 15/087,804, of Zigoris, P., et al., filed Mar. 31, 2016.
Final Office Action dated Mar. 2, 2020, for U.S. Appl. No. 15/194,250, of Qi, Y., et al., filed Jun. 27, 2016.
"Define Frequency", Retrieved from Internet URL: https://www.google.com/search?q=define+freguency&rlz=1C1GCEB_enUS775US775&oq=define+&aqs=chrome.0.69i59l3j69i57j0l4.1111j1j1&sourceid=chrome&ie=UTF-8, 1 page.
Non-Final Office Action dated May 27, 2020, for U.S. Appl. No. 15/087,774, of Zigoris, P., et al., filed Mar. 31, 2016.
Second Office Action dated May 17, 2020, in Canadian Patent Application No. 3,019,369 of Zigoris, P., et al.
Advisory Action dated Jun. 5, 2020, for U.S. Appl. No. 15/194,250, of Qi, Y., et al., filed Jun. 27, 2016.

\* cited by examiner

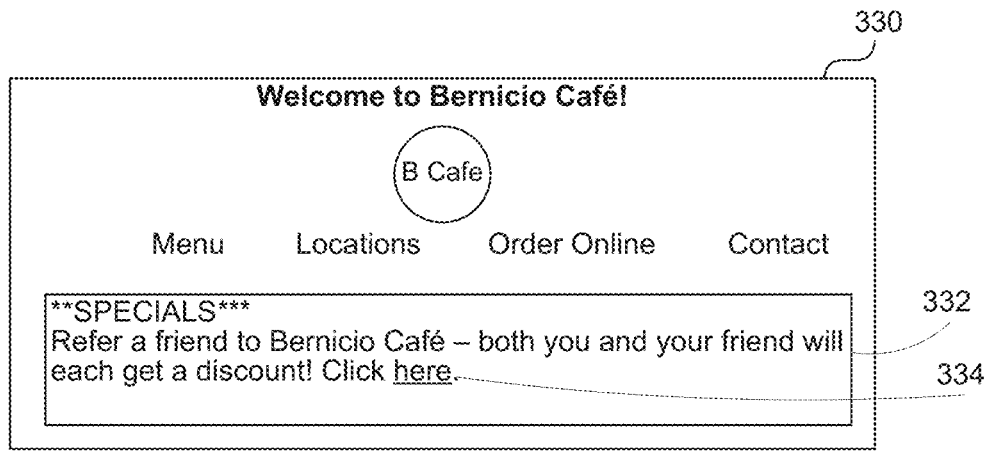
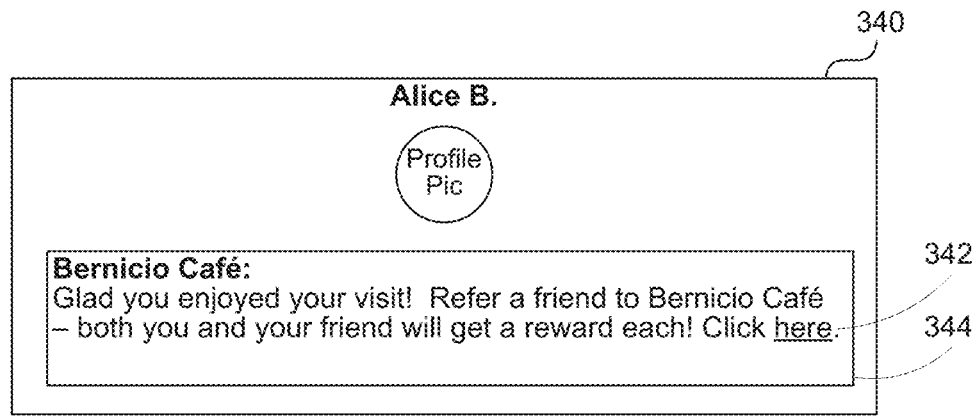
*FIG. 3B*

| Referral ID | Customer ID1 | Customer ID2 | First Name | Last Name | Billing Address |
|---|---|---|---|---|---|
| 123456 | Johndoe@gmail.com | 503-727-1000 | John | Doe | 654 ABC St., New York, NY 10086 |
| Coupon_1101 | Janedoe@gmail.com | -- | Jane | Doe | -- |
| -- | Sally@gmail.com | 203-764-2980 | Sally | Smith | 30 Rock St., New York, NY 10086 |
| -- | johnj@gmail.com | 203-764-2980 | John | James | 123 Sesame St., Palo Alto, CA 94304 |
| 956788 | alex@gmail.com | 310-888-1000 | Alex | Kirkson | 123 Easy St., Mountain View, CA 94041 |

602

| Customer ID1 | Payment Card Number/ Account Number | Issuer | Expiration | Billing Address |
|---|---|---|---|---|
| johnj@gmail.com | XXXXXXXXXX | Bank of America | 1/31/2016 | 123 Sesame St., Palo Alto, CA 94304 |
| Janedoe@gmail.com | XXXX-XXXX-XXXX-XXXX | Wells Fargo | 5/31/2017 | 100 PQ st, Seattle, WA 98101 |
| JohnDoe@gmail.com | XXXX-XXXX-XXXX-XXXX | Chase | 6/1/2015 | 654 ABC St., New York, NY 10086 |
| Sally@gmail.com | -- | -- | -- | 30 Rock St., New York, NY 10086 |
| alex@gmail.com | XXXX-XXXX-XXXX-XXXX | Wells Fargo | 1/31/2016 | 123 Easy St., Mountain View, CA 94041 |

604

| Transaction ID | Customer ID1 | Date | Merchant Name | Amount | Product Code |
|---|---|---|---|---|---|
| Z22351 | johnj@gmail.com | Bank of America | 1/31/2016 | 123 Sesame St., Palo Alto, CA 94304 | 10986 |
| A25684 | Janedoe@gmail.com | Wells Fargo | 5/31/2017 | 100 PQ st, Seattle, WA 98101 | Coffee |
| B25684 | JohnDoe@gmail.com | Chase | 6/1/2015 | 654 ABC St., New York, NY 10086 | Pastry |
| C25684 | Sally@gmail.com | -- | -- | 30 Rock St., New York, NY 10086 | 56986 |
| F25114 | alex@gmail.com | Wells Fargo | 1/31/2016 | 123 Easy St., Mountain View, CA 94041 | 10988 |

GENERATION AND TRACKING OF REFERRALS IN RECEIPTS

RELATED APPLICATIONS

This application claims priority to and is a continuation of U.S. patent application Ser. No. 14/529,024, filed on Oct. 30, 2014, the entire contents of which are incorporated herein by reference.

BACKGROUND

Merchants often utilize referral programs as a marketing tool to increase new customer business. Referral programs generally provide existing customers the ability to earn rewards points and/or discounts by referring new customers to a merchant. In a traditional approach, a merchant typically invites the existing customer to share a hyperlink to a website of the merchant or other online information about the merchant, e.g., on a social network of the existing customer. Upon detection of access to the hyperlink (e.g., when a friend clicks the hyperlink posted on an existing customer's social media page), the existing customer receives a reward from the merchant, for example.

One problem with this traditional approach is that the tracking and maintenance of different referrals can be burdensome. For example, the hyperlink may be re-sharable by other people, and therefore may not necessarily be unambiguously associated with the existing customer. As such, the customer may not benefit when the hyperlink is accessed. Further, tracking of referrals can be complicated when it comes to offline transactions at physical merchant locations where there is no activation of a hyperlink to detect.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

FIGS. 3A-3B illustrate examples of various screen displays that can be generated by a referrer's computing device to enable initiation of generation of a referral.

FIG. 6 illustrates an example of database tables maintained by a payment service system to facilitate a referral.

DETAILED DESCRIPTION

Figure 1:
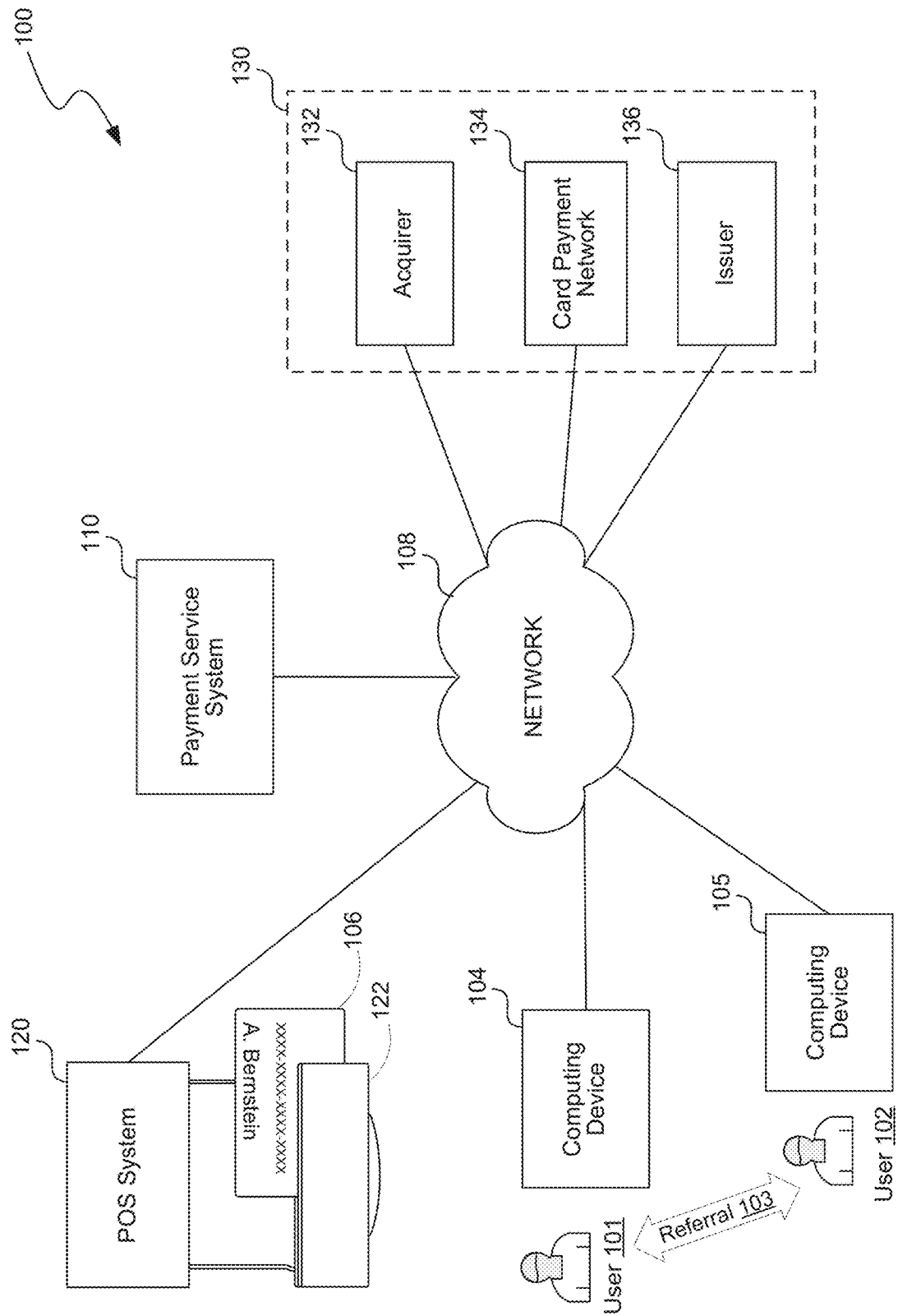
FIG. 1 illustrates an environment in which the referral technology can be implemented.

Technology is disclosed herein for facilitating a referral, of a promotional offer of goods or services, from a referrer to a referee, including generation of the referral and tracking of referral redemption (collectively referred to herein as "the referral technology"). The referral technology enables a customer to send a referral about a merchant to another person (e.g., a friend or relative) by simply providing contact information associated with that other person (e.g., email address), and further enables the other person to redeem a promotional offer included in the referral automatically upon use of that other person's payment card at the merchant's point-of-sale (POS) system, without having to provide any further information. The term "payment card" as used herein refers to a payment mechanism associated with a physical card, such as a conventional credit card, debit card, or stored value card, a so-called "smartcard" that has an embedded integrated circuit chip (e.g., Europay-MasterCard-Visa (EMV) cards), or a card that functions as a combination of any of these mechanisms.

Note that references in this description to "an embodiment", "one embodiment", or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

In some embodiments, the referral technology involves communication between a payment service application installed on a merchant's POS system and a remote payment service system (PSS). The payment service application enables the merchant to prompt a customer (the "referrer") to send a referral that includes a promotional offer to a potential new customer (the "referee"). For example, the payment service application generates a receipt for the transaction, where the receipt includes a referral prompt generated on behalf of the merchant. The receipt can be a digital receipt that is presented in an electronic message, such as an email to the referrer or on a display terminal of the POS system. The referrer can initiate the process for the referral by inputting contact information of the referee ("referee information"), such as an email address and name of the referee, to the POS system. The payment service application communicates this information to the PSS, which then executes or triggers execution of the generation and sending of the referral to the referee based on the referee information. The referee receives and accepts the referral and the included promotional offer (e.g., at a computing device of the referee, by reading and replying to an email message sent from the PSS). Upon acceptance by the referee, the PSS associates the referee's email address with the referral and stores such association for use in redemption of the promotional offer.

In some embodiments, the referee can automatically redeem the promotional offer included in the referral by using the referee's payment card at the POS system of the merchant, without having to provide any information related to the referral or the referee. In such embodiments, the referee has a service account with the PSS, where the referee's email address and/or other contact information is registered with the PSS and is associated with the referee's payment card information. When the referee makes a purchase transaction with the merchant by using his/her payment card, the payment service application, installed on the merchant's POS system, automatically detects the payment card information from the payment card and communicates that information to the PSS. The PSS, in turn, identifies the promotional offer based on an identification of the association between the payment card information and the email address, which has been stored in association with the referral. Based on this identification, the PSS executes or causes execution of the redemption process of the promotional offer included in the referral at the POS system. In some embodiments, the PSS further executes or causes execution of a transfer of a referral reward (e.g., points, discount, payment, etc.) to the referrer in response to a redemption of the promotional offer by the referee.

Among other benefits, the referral technology provides a seamless process for both the referrer and the referee in the generation, acceptance, and redemption associated with the referral. In particular, the referee, on one hand, is able to enjoy the benefit of the referral by simply making a purchase, without having to maintain and/or remember any details about the promotional offer once he/she has accepted the referral from the referrer. The referrer, on the other hand, can be compensated automatically based on the referee's purchase, without having to track the referral once he/she has provided the referee information to initiate the process for the referral. Additionally, the merchant is provided with an effective tool for increasing and maintaining customer business. In particular, the merchant is able to reach out to new customers based on the personal relationships of existing customers. Further, with the stored associations between the referral and the referrer/referee, the merchant is able to effectively track the referral and to reward both the referrer and the referee, thereby encouraging loyalty in both existing and new customers.

The PSS in at least some embodiments is a secure payment service business enterprise and computer system, that is engaged by a merchant to process payment transactions initiated at the merchant's POS system. The merchant initially installs a payment service application, executed by the PSS, on the POS system. The POS system can be, for example, a conventional personal computer (PC), such as a desktop computer or laptop computer, or it may be a smartphone, tablet computer, or any other known or convenient computing device. The payment service application can be a mobile application (i.e., a mobile "app") or a conventional software application. The payment service application communicates with the PSS to process transactions instantiated, or executed, at the POS system.

Consider the following example scenario in which the referral technology can be implemented, where the example scenario includes three phases. The three phases involve a referral generation phase, a referral acceptance phase, and a referral redemption phase. Phases one and two operate as the referral initiation process, where a customer (e.g., a first customer) requests a referral, including a promotional offer, to be generated for a friend (e.g., a (potential) second customer) and where the friend, or second customer, accepts the promotional offer included in the referral ("referral initiation process"). Phase three operates as the referral redemption process where the friend redeems the promotion offer and the redemption is automatically processed (i.e., "redemption process").

In phase one, a first customer visits the merchant's physical business location and makes a purchase at the POS system by using his payment card (e.g., a credit card). The payment service application installed on the POS system obtains payment card information from the payment card purchase transaction (e.g., via a swipe of the credit card through a card reader coupled to the POS system). In some embodiments, the payment service application also obtains an email address of the first customer ("first email address") by prompting, or requesting, whether the first customer wishes to receive an electronic receipt for the transaction. In such embodiments, upon receiving the first email address, the payment service application communicates to the PSS the first email address and the transaction information (e.g., the payment card information, transaction date/time, transaction ID, transaction item description of item(s) purchased by the first customer, etc.). The PSS, in turn, generates and sends an electronic receipt to the first customer (e.g., via the first email address).

In some embodiments, the electronic receipt can include a first referral user interface (UI) element configured to prompt the first customer to indicate whether he desires to send a referral to someone, such as a friend, relative or coworker. In some embodiments, the first referral interface element can be a text display with a hyperlink that operates to redirect the first customer to a landing page, which contains input fields for the first customer to submit information about the first customer (i.e., himself) and about a new customer (i.e., his friend), e.g., a potential second customer. The information about the second customer (i.e., referee information) can be, for example, the second customer's name and email address. The information about the first customer can be, for example, the first customer's name and email address. In some embodiments, the information about the first customer can be auto-populated based on the information related to the transaction. For example, the first referral interface element can be a text display, "Refer a friend, and both you and the friend get a free coffee each! Click here."

In some embodiments, the first referral interface element includes a text and/or graphical display that prompts the first customer to submit the referee information by sending an email (e.g., in reply to the email that includes the electronic receipt). In some embodiments, the first referral interface element can be a text display that prompts the first customer to submit the referee information by sending a text message (e.g., in reply to a text message that includes the electronic receipt).

In some embodiments, the first referral interface element includes the input fields that allow the first customer to submit the referee information. For example, the electronic receipt, in such embodiments, can be displayed by an interface of the payment service application installed on the POS system, where the first referral interface element is part of the interface. In another example, the electronic receipt, in such embodiments, is received at a mobile payment application installed on a mobile device of the first customer, and the electronic receipt, along with the first referral interface element, is displayed on an interface of the mobile payment application.

In some embodiments, the first referral interface element is generated independently of the receipt. For example, the first referral interface element can be generated by the PSS for display on a website associated with the merchant. In another example, the first referral interface element is generated by the PSS for display on a social network associated with the referrer. In yet another example, the first referral interface element is generated as part of an interface, separate from the electronic receipt, of the payment service application installed on the POS system.

The PSS next receives the referee information submitted by the first customer (e.g., via email, website, or the payment service application), where communication of the referee information to the PSS triggers a request from the first customer to generate the referral. Submission by the first customer also triggers transmission of the information related to the transaction (e.g., first email address and transaction information) to the PSS. The PSS uses the information related to the transaction and the referee information to generate the referral and a promotional offer to include in the referral. For example, from the transaction information, the PSS can determine that the first customer has purchased a bag of ground premium coffee "X", and in response, the PSS generates a referral that includes a free cup of premium coffee "Y" (i.e., the promotional offer) for both the first and second customers. In some embodiments, the PSS also associates the referral with at least a portion of the information related to the transaction, and stores such association in a database of the PSS. The portion of information related to the transaction can include, for example, the payment card information identifying a payment card of the first customer.

In phase two, the PSS sends a referral message representative of the generated referral to the second customer, based on the referee information (e.g., via email address). The referral message includes a second referral interface element that is configured to prompt the second user to accept the referral with the promotional offer. In some embodiments, the referral message is sent via email based on the email address of the referee provided by the referrer in phase one. In such embodiments, the second referral interface element included in the referral message can prompt the second customer to accept the referral by sending an email (e.g., a reply email). In some embodiments, the referral message is sent via text messaging (e.g., a short message service (SMS) message) based on a telephone number of the referee provided by the referrer in phase one. In such embodiments, the second referral interface element prompts the second customer to accept by sending a text message (e.g., a reply text message).

In some embodiments, the second referral interface element is configured to prompt the second customer to submit information in order to accept the referral (and the included promotional offer). In one example, the information can include payment card information associated with a payment card of the second customer. In another example, the information can include account login information for linking the referral with the account (e.g., a bank's debit card linked referral).

Upon receiving the acceptance from the second user, the PSS associates the referral with at least a portion of the referee information and/or the information submitted with the acceptance. For example, the PSS can associate the email address of the second customer ("second email address") with the promotional offer included in the referral, and stores the association in a database of the PSS for use in a redemption process of the promotional offer in the referral in a future transaction. In another example, the PSS can associate the payment card information of the second customer ("second payment card information") with the referral, and stores the association in a database of the PSS for use in a redemption process of the promotional offer in the referral in a future transaction.

For the sake of simplicity, in the example scenario the second email address of the referee has already been stored independently by the PSS in a previous transaction conducted by the second customer at a particular merchant's POS system. The particular merchant can be either the same merchant with whom the first customer conducts the transaction discussed above, or a different merchant, as long as the particular merchant conducts the previous transaction at a POS system that can communicate with the PSS (e.g., through a payment service application installed on that POS system). From the previous transaction, the PSS has received both the second payment card information obtained from a payment card of the second customer and the second email address to deliver an electronic receipt for the previous transaction. Further, the PSS has stored the second payment card information in association with the second email address. Accordingly, upon receipt of the referral acceptance from the referee, the database of the PSS contains the second payment card information, the second email address, and the referral stored in association with the second email address, all of which can be used in the redemption process of the promotional offer in the referral to be discussed in phase three.

In phase three, the second customer, prompted by the referral, visits the merchant's physical business location and makes a purchase at the POS system in a second transaction by using the second customer's payment card (e.g., a credit card). The payment service application installed on the POS system first obtains the second payment card information from the second customer's payment card (i.e., "second payment card"). The payment service application communicates the second payment card information and other information related to the transaction, such as item description of items purchased in the second transaction (e.g., a cup of coffee and a pastry), to the PSS. The PSS performs a database lookup to identify the second payment card and the second email address that is associated with the second payment card. Based on the second email address, the PSS identifies, or recognizes, the referral based on the previously stored association between the referral and the second email address. In response to the identification of the referral, the PSS causes execution of a redemption process of the promotional offer included in the referral.

In some embodiments, execution of the redemption process involves the PSS communicating the identification of the referral to the payment service application, which, in turn, applies a deduction at the POS system to the transaction amount of the transaction between the second customer and the merchant. For example, the deduction can be equivalent to the purchase price of the cup of coffee (i.e., free cup of coffee. In this example, the transaction amount charged to the second payment card would only be, e.g., the price of the pastry.

In some embodiments, execution of the redemption process occurs post-transaction, where the PSS communicates with a financial system associated with the second payment card of the second customer to cause an amount to be credited back into a payment account of that card. In some embodiments, the amount can be transferred from a payment account of the PSS to the payment account of the second customer's payment card. In some embodiments, the amount can be transferred from a payment account of the merchant to the payment account of the second customer's payment card.

In some embodiments, execution of the redemption process occurs post-transaction, where the PSS communicates with a financial system associated with the second payment card of the second customer to void and/or edit a payment authorization request. In such embodiments, the transaction amount of the second transaction has been submitted for authorization. The PSS, in executing the redemption process, transmits to the financial system a request to edit the amount in the authorization request. In one example, the PSS requests to void the requested transaction (e.g., free coffee). In another example, the PSS requests to reduce the requested authorization amount (e.g., a discount on purchased coffee).

In some embodiments, the execution of the redemption process in phase three occurs post-transaction based on an initiation of the second customer, as opposed to execution during the second transaction. For example, the second customer receives an electronic receipt for the second transaction with the merchant. In such receipt, the second customer is notified of the referral with a message prompting the second customer to redeem the referral (e.g., "Make cup of coffee free!"). An example of such a message is shown in a display 700 of FIG. 7. The notification of the referral can be a third referral interface element that, upon being activated, causes the referral to be applied to the second transaction. An example of the third referral interface element is shown as component 702 in the display 700 of FIG. 7. In some embodiments, upon receiving an indication that the second customer wishes to apply the referral (e.g., a click on a link or button displayed on the receipt), the PSS communicates with a financial system associated with the second payment card of the second customer to cause an amount to be credited back into a payment account of the second payment card.

Note that in the above discussed example scenario, a payment card, which is a specific type of payment object, is utilized by the first and second customers. However, a customer (e.g., the first or second customer) can use a payment object other than a payment card in the implementation of the referral technology in other embodiments. An example of another type of payment object that may be used for this purpose is a biometrically identifiable object, such as a person's finger (e.g., for fingerprint recognition), face, iris or retina. Alternatively, a payment object can be a software object or virtual object, such as a virtual wallet. Additionally, a payment card other than a credit card may be utilized in the implementation of the referral technology, such as a debit card or a pre-paid gift card. In one example, a customer can place his/her finger on a fingerprint scanner to utilize his/her fingerprint as a payment object to initiate payment for a transaction. In this example, the fingerprint can be authenticated and subsequently sent to a financial system (e.g., a card payment network) for payment authorization. The authenticated fingerprint can then be stored by the PSS in association with an identifier of a customer for use in the referral technology.

In some embodiments, the payment card of a customer has a pre-established association with the PSS, such that any transaction approval request relating to that card will get routed to the PSS. In such embodiments, the customer's payment card may be a "proxy card." A proxy card, as that term is used herein, is a card that bears a card number/account number that appears to be that of a real credit or debit card account (i.e., it is in the correct format), but where that card/account number is actually only a proxy for the customer's real card or account number. In that case, the customer's real account number is stored by the PSS in association with the proxy card account number, and is used to pay for a transaction made using the card. Further, such a proxy card may be associated with multiple accounts and/or other payment mechanisms of different types (e.g., credit card accounts, debit card accounts, etc.) of the customer, where any one of those payment mechanisms can be selected by the customer or automatically by the PSS to pay for a given transaction.

Additionally, note that while an email address is discussed in the above example scenario, other types of contact information can be utilized in the implementation of the referral technology in other embodiments. Examples of such contact information include any identifier associated with an individual customer (e.g., first or second customer). The identifier can be, for example, a telephone number, a driver's license number, a social security number, a messaging handler (e.g., instant message username, social networking username, etc.), an employee identification number ("employee ID"), a device identifier ("device ID"), a mobile application identifier ("app ID"), an IP address, a personal identification number (PIN), a card verification value (CVV), a security access code, a biometric identifier (e.g., fingerprint, face, iris, retina, etc.), or any other identification means.

Further, in accordance with the above-discussed embodiments, the referral technology involves communication between the payment service application installed on the merchant's POS system and the PSS. However, in other embodiments, the referral technology can be implemented by the PSS communicating with other remote systems to facilitate the referral. In some embodiments, the PSS can directly communicate with the merchant. In such embodiments, the merchant may access a web portal hosted by the PSS to provide the PSS with the information related to various transactions (e.g., contact information, transaction information, etc.) for facilitation of the referrals.

In some embodiments, the PSS communicates with a card network payment that handles payment authorizations in order to facilitate the referrals. In such embodiments, the PSS sends the card payment network a list of payment cards that have registered with the PSS. When a transaction is initiated at a POS system using a card that is on the list of payment cards, the card payment network receives the payment authorization request for that transaction and forwards to the PSS the transaction information (e.g., payment card information, transaction amount, transaction location, etc.). The PSS can then utilize that information in various operations performed to implement the referral technology, such as receipt generation and referral generation.

The term "cause" and variations thereof, as used in the preceding paragraph and elsewhere in this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

Various examples of the referral technology will now be described in further detail. The following description provides specific details for a thorough understanding and enabling description of these examples. One skilled in the relevant art will understand, however, that the referral technology discussed herein may be practiced without many of these details. Likewise, one skilled in the relevant art will also understand that the referral technology can include many other obvious features not described in detail herein. Additionally, some well-known structures or functions may not be shown or described in detail below, so as to avoid unnecessarily obscuring the relevant description.

FIG. 1 illustrates an environment 100 in which the referral technology can be implemented according to some embodiments. The environment includes a POS system 120 of a merchant, a computing device 104 of a first user 101, and a computing device 105 of a second user 102. The computing devices 104, 105 can each be, for example, a smartphone, a tablet computer, a notebook computer, a desktop, or any other form of processing device. The environment 100 also includes a financial system 130 and a payment service system 110.

The financial system 130 can include a computer system 132 of the merchant's acquirer, a computer system 134 of an issuing bank, and a computer system 136 of a card payment network. The merchant's acquirer can be a bank or financial institution that processes payments (e.g., credit or debit card payments) on behalf of the merchant. The acquirer acquires the payments from an issuer. The issuer (or issuing bank) is a bank or financial institution that offers a financial account (e.g., credit or debit card account) to the users 101, 102, respectively. The issuer issues payments to the acquirer on behalf of the users 101, 102, respectively.

The environment 100 can accommodate both traditional payment card transactions (i.e., those involving reading of a physical card (e.g., payment card 106) of a customer (e.g., user 101 or user 102) at the merchant's location), as well as card-not-present (CNP) transactions (i.e., those where the card is not physically presented at the time that the payment is effected).

In a traditional credit card transaction, for example, the merchant swipes the payment card 106 (e.g., a credit card) of the user 101 through a card reader 122 at the POS system 120. The term "swipe" here refers to any manner of triggering a card reader to read data from a card, such as by passing a card into or through a magnetic stripe card reader, optical scanner, smartcard (card with an embedded IC chip) reader (e.g., an EMV-compliant card reader), radio frequency identification (RFID) reader, or the like. The POS system 120 sends data obtained, or read, from the card (e.g., the cardholder's name, credit card number, expiration date, card verification value (CVV), etc.) to the computer system 132 of the merchant's acquirer (hereinafter "acquirer 132"). The acquirer 132 sends this data to the computer system 134 of the card payment network (e.g., Visa or MasterCard) (hereinafter "card payment network 134"), which forwards the data to the computer system 136 of the issuing bank (hereinafter "issuer 136"). If the transaction is approved by the issuer 136, a payment authorization message is sent from the issuer 136 to the merchant POS system 120 via a path opposite of that described above. The traditional credit card transaction can be repeated when the user 102 uses his/her payment card at the POS system 120.

In a card-not-present transaction, for example, the user 101 places an online order by transmitting the data of a credit card from a computing device (e.g., the computing device 104 or the computing device 105) to the POS system 120. The POS system 120 can include, e.g., a web server for receiving the online order information. Then the POS system 120 sends the data of the card to the acquirer 132. The acquirer 132, the issuer 134 and the card payment network 136 complete the transaction in a way similar to the traditional credit card transaction.

Note that for ease of discussion, the acquirer 132, the card payment network 134, and the issuer 136 may be collectively referred to as the financial system 130 throughout the specification.

The payment service system 110 (hereinafter, "PSS 110") can include a computer system operated by a payment service business enterprise. The PSS 110 includes one or more server computers programmed to facilitate the initiation, generation, acceptance, and redemption associated with referrals. The one or more server computers of the PSS 110 can further be programmed to provide interactive UIs for facilitating the referral. The PSS 110 can collect information from various parties, such as the POS system 120, the computing devices 104, 105 of the users 101, 102, and the financial system 130.

In some embodiments, the POS system 120 includes a payment service application installed on the POS system 120. In such embodiments, the PSS 110 can collect information through the payment service application, such as information related to transactions conducted at the POS system between the merchant and one or more customers (e.g., the users 101, 102). The information related to the transactions can include any contact information provided by the customers and transaction information, such as transaction date/time, transaction ID, transaction item description, transaction location, payment card information (e.g., a cardholder's name, payment card number, expiration date, card verification value (CVV), etc.), among others.

In some embodiments, the POS system 120 includes a mobile payment application installed on a computing device of a customer (e.g., the computing device 104 or the computing device 105). In such embodiments, the PSS 110, through the mobile payment application, can collect information related to a referral, such as referee information from the user 101 in a request to initiate and/or generate the referral and other information from the user 102 in an acceptance of the referral (e.g., payment card information, financial account login information, etc.).

In some embodiments, the POS system 120 includes a network interface component configured to communicate with remote computer systems (e.g., financial system 130) and/or computing devices (e.g., devices 104, 105) to facilitate the referral process. For example, the POS system 120 communicates with one or more computer systems of the financial system 130 to obtain payment authorization for various transactions. In another example, the POS system 120 communicates with the computing device 104, e.g., via email or text message, to obtain referee information from the user 101. In yet another example, the POS system 120 communicates with the computing device 105, e.g., via email or text message, to obtain other information from the user 102 in an acceptance of the referral of a customer.

Based on the collected information from the various parties, the PSS 110 can help the merchant track the referral, from initiation, to generation, to acceptance, and to redemption. For example, the PSS 110 can collect and maintain information about each of the users 101, 102, the transactions associated with the users 101, 102, and the referral shared between the users 101, 102. Using such information, the PSS 110 can associate certain pieces of information and store such association to facilitate a seamless experience for the user 101, the user 102, and the merchant. Further details regarding facilitation of the referral will be discussed in FIGS. 2-8.

Note that each of the aforementioned computer systems can include one or more distinct physical computers and/or other processing devices, which, in the case of multiple devices, can be connected to each other through one or more wired and/or wireless networks. All of the aforementioned devices are coupled to each other through an internetwork 108, which can be or include the Internet and one or more wireless networks (e.g., a WiFi network and/or a cellular telecommunications network).

Figure 2:
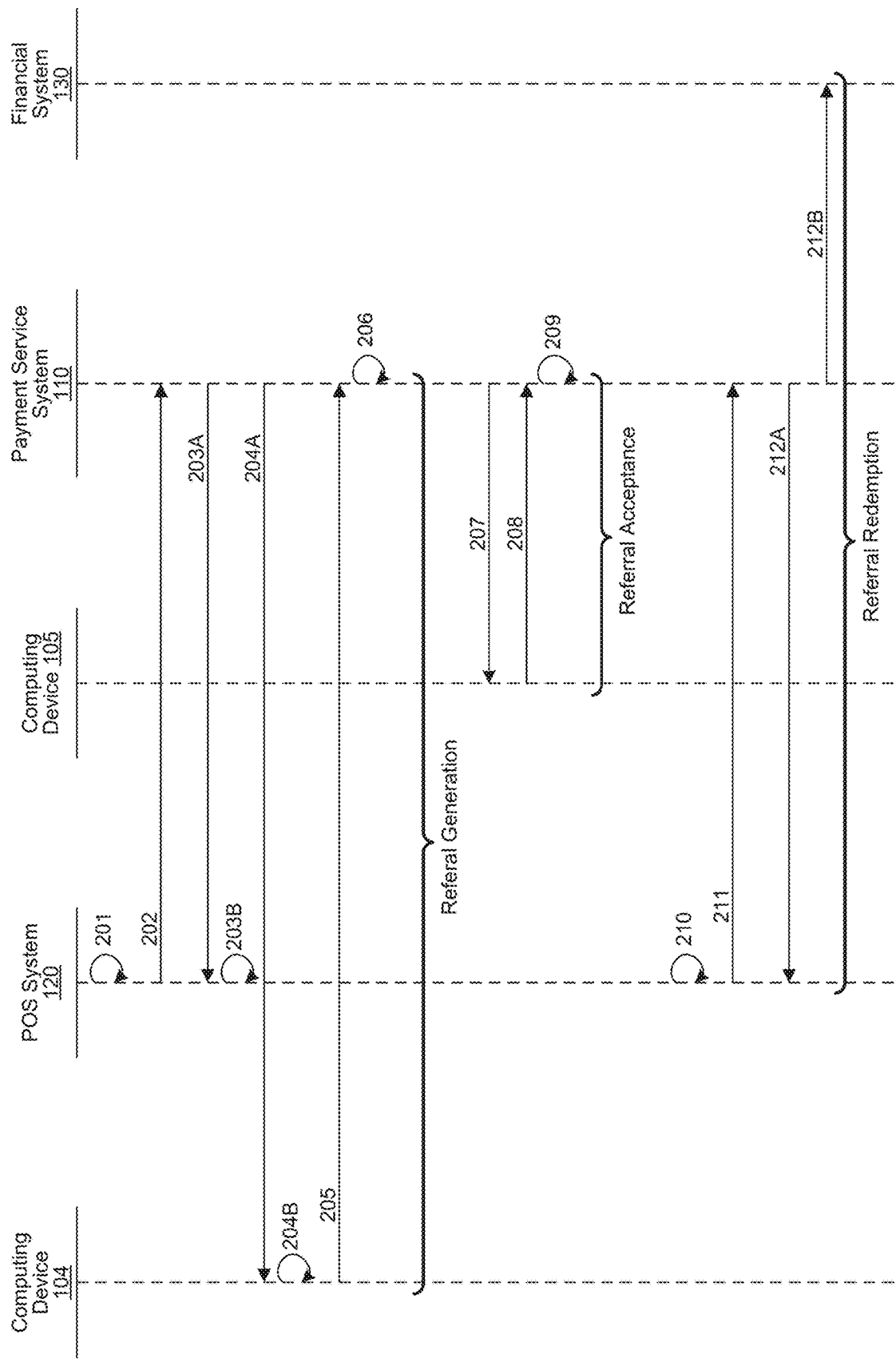
FIG. 2 is a sequence diagram illustrating a process of facilitating a referral with use of a payment card.
Figure 3A:
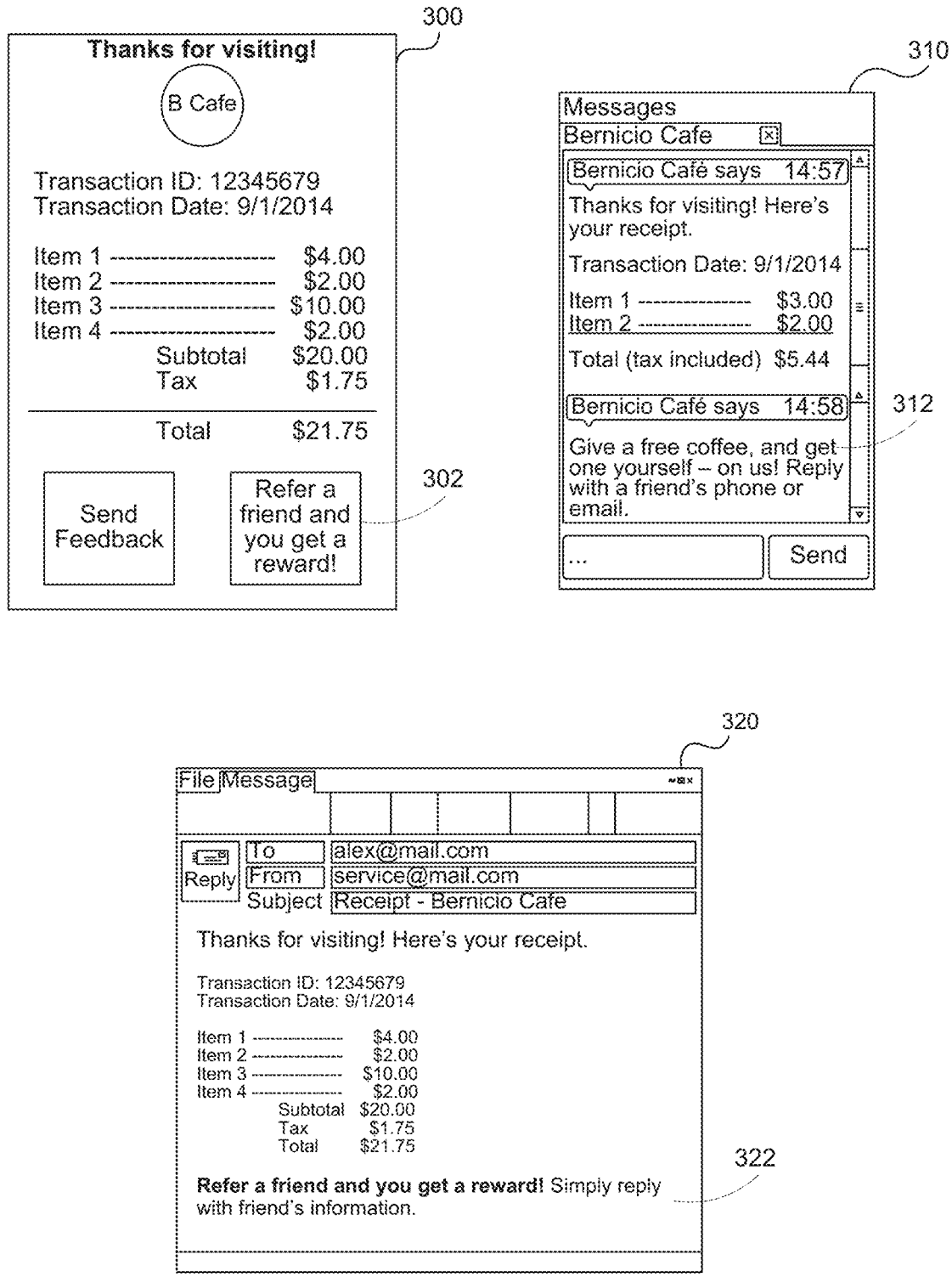
Figure 4:
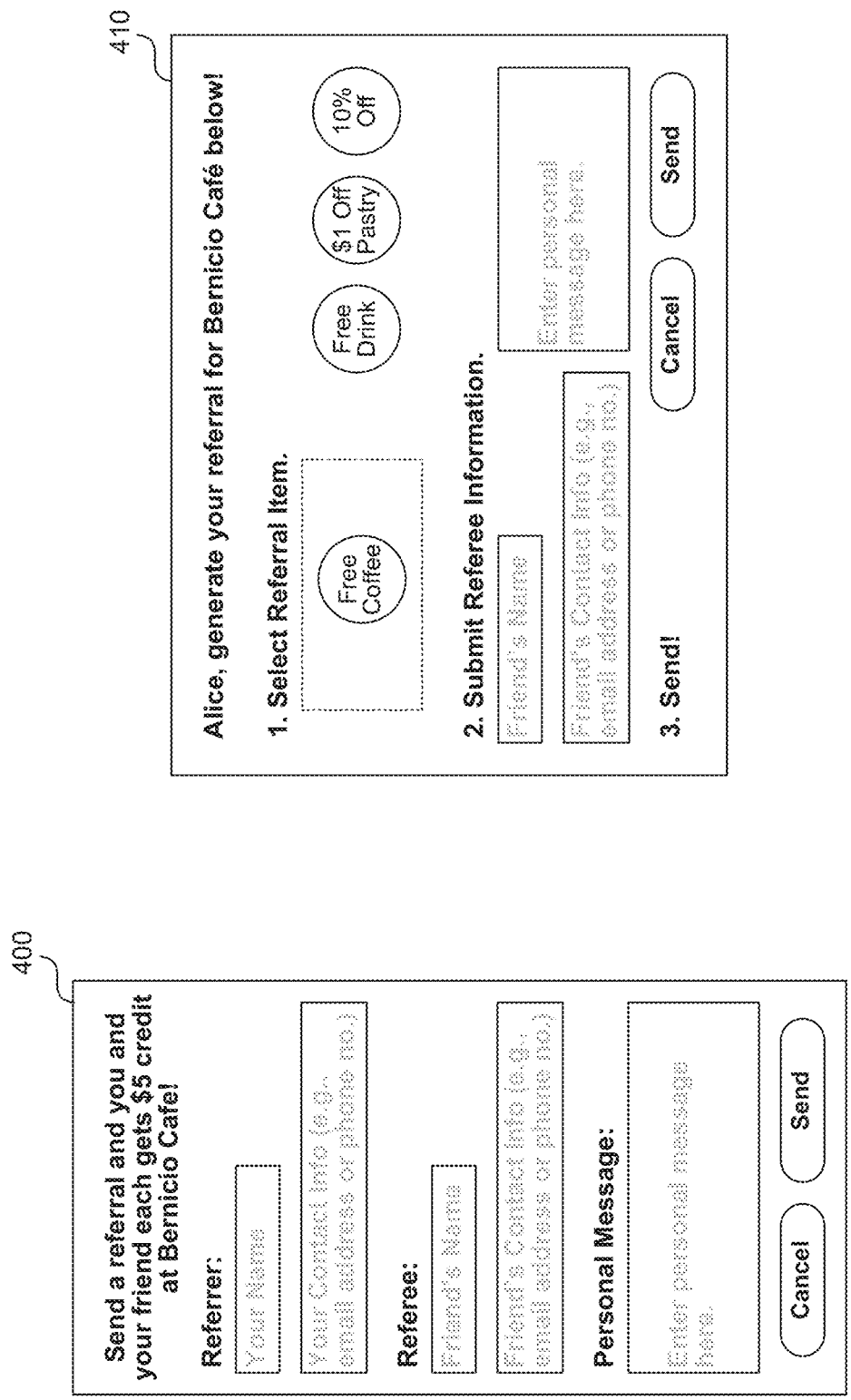
FIG. 4 illustrates examples of various screen displays that can be generated by a referrer's computing device to enable submission of referrer and referee information to generate a referral.

FIG. 2 is a sequence diagram illustrating a process of facilitating a referral with use of a payment card, according to some embodiments. For purposes of illustration only, the process of FIG. 2 is explained with reference to one or more components illustrated in FIG. 1. The process begins at step 201, in which the merchant initiates a payment transaction at the POS system 120 by reading card data, or payment card information, from the payment card 106 of the first user 101 in response to a card swipe through the card reader 122. The payment card 106 can be an actual credit or debit card of the consumer, for example, or it can, instead, be a proxy card such as described above (e.g., a card issued by the PSS 110 and associated with one or more financial accounts of the first user 101). The payment card information can include, for example, the first user's name, payment card number, expiration date, and card verification value (CVV).

At step 202, in response to the card swipe, the POS system 120 transmits onto the internetwork 108 a transaction approval request that includes transaction information, or transaction data, about the transaction, for transmission to the PSS 110. The transaction data can include, for example, the aforementioned payment card data, as well as the amount of the transaction, transaction date and time, data identifying the merchant and the merchant's merchant category code (MCC). The transaction approval request can be transmitted directly to the PSS 110 (e.g., through the payment service application installed on the POS system 120), or it can get routed to the PSS 110 through one or more intermediary entities, such as the acquirer 132 and/or card payment network 134 of the financial system 130. Upon receiving the transaction approval request, the PSS 110 approves the transaction. Note that for the sake of simplicity, the scenario in which the transaction is denied is not discussed here, since it is not germane to the technique being introduced.

In response to the transaction being approved, the PSS 110 performs at least the following two additional operations. At step 203A, the PSS 110 sends onto the internetwork 108 a transaction approval message, for transmission to the POS system 120. In addition, at step 204A, the PSS 110 transmits an electronic receipt message onto the internetwork 108, for transmission to the computing device 104 of the user 101 (e.g., over a wired or wireless communications network). The electronic receipt message contains information regarding the transaction, i.e., an electronic receipt, including whether the transaction has been approved, the amount of the transaction, the name of the merchant, and in at least some instances, an item description that itemizes the items purchased in (or otherwise the subject of) the transaction. Note that steps 203A and 204A can be performed in any order or concurrently.

At step 203B, the POS system 120 receives the transaction approval message sent by the PSS 110 (e.g., through the payment service application) and, in response, outputs a conventional transaction approval indication to the merchant. The indication may be in the form of, for example, a printed receipt, an electronic receipt displayed on a display device associated with the POS system 120, or both. In some embodiments, within the POS system 120, the transaction approval message is conveyed up through the various lower protocol layers to a payment service application, which recognizes the electronic receipt included in the transaction approval message. In response to recognizing the electronic receipt, at step 203B, the payment service application causes the POS system 120 to display the electronic receipt to the user 101. As will be discussed in further details below, in some embodiments, the electronic receipt includes a first referral interface element that is configured to prompt the user 101 to indicate whether he desires to send a referral about the merchant to a friend, such as the second user 102.

In addition to step 203B, at step 204B, the computing device 104 of the first user 101 receives the electronic receipt message sent by the PSS 110. In some embodiments, within the computing device 104, the electronic receipt message is conveyed up through the various lower protocol layers to a mobile payment application, which recognizes the electronic receipt message as such. The mobile payment application can be associated with the PSS 110. For example, the mobile payment application executes one or more operations based on computer instructions received from the PSS 110, e.g., over a wireless communication network. In another example, the mobile payment application is a standalone application configured to communicate and/or work in coordination with the PSS 110. In response to recognizing the electronic receipt message, at step 204B, the mobile payment application causes the computing device 104 to display the electronic receipt to the user 101.

In some embodiments, the electronic receipt message is a text message sent to a telephone number of the first user 101, and is conveyed up through various lower protocol layers to a text messaging application installed on the computing device 104. The telephone number of the first user 101 has been either stored by the PSS 110 in a previous transaction or provided by the first user 101 in the current transaction (e.g., at step 201). An example of the electronic receipt sent as a text message is shown in a display 310 of FIG. 3A.

In some embodiments, the electronic receipt message is an email message sent to an email address of the first user 101, and is conveyed up through various lower protocol layers to an email application installed on the computing device 104. The first email address of the first user 101 has been either stored by the PSS 110 in a previous transaction or provided by the first user 101 in the current transaction (e.g., at step 201). An example of the electronic receipt sent as an email message is shown in a display 320 of FIG. 3A.

In some embodiments, the electronic receipt message is displayed to the user 101 within a graphical user interface of a mobile application (e.g., a mobile receipt application or a mobile payment service application) installed on the computing device 104. For example, the mobile application can be downloaded from a remote server system that is employed by a merchant to process and/or manage transactions. The remote server system can be, for example, the PSS 110 of FIG. 1. Through the mobile application, the first user 101 can access details about transactions conducted at one or more merchants, including, for example, viewing a receipt and initiating a referral generation process. An example of the electronic receipt message displayed within a mobile application is shown in a display 300 of FIG. 3A.

In some embodiments, the electronic receipt, contained within the electronic receipt message, includes a first referral interface element. The first referral interface element is configured to prompt the user 101 to indicate whether he desires to send a referral about the merchant to a friend, such as the second user 102. The user 101 can indicate that he would like to send, or initiate sending of, the referral by, for example, touching a "Refer a friend and get a reward" virtual tile (i.e., the first referral interface element) on a touchscreen display of the computing device 104. An example of such a first referral interface element is shown as component 302 in FIG. 3A. The process ends if the user 101 indicates that he does not desire sending a referral.

In some embodiments, the first referral interface element includes input fields that allow the first user 101 to submit information about the first user 101 (i.e., himself) ("referee information") and about the second user 102 (i.e., his friend) ("referrer information"). In such embodiments, the input fields can be generated for display in response to receiving an indication from the user 101 that he wants to send a referral. For example, when the user 101 clicks, or touches, the "Refer a friend and get a reward" virtual tile, the mobile payment application causes the computing device 104 to display the input fields. Examples of the input fields are shown in displays 400 and 410 of FIG. 4.

In some embodiments, the first referral interface element is a text display within an email message receipt that prompts the first user 101 to send a reply email message with the referee information and/or the referrer information. An example of such an interface element is shown as text display 322 in FIG. 3A. In some embodiments, the first referral interface element is a text display within a text message receipt that prompts the first user 101 to send a reply text message with the referee information and/or the referrer information. An example of such an interface element is shown as text display 312 in FIG. 3A.

In some embodiments, the user 101 only receives a paper receipt at the POS system 120 for the transaction with the merchant, as opposed to an electronic receipt message. For example, the user 101 receives the paper receipt that is generated and sent from the PSS 110 and printed at the POS system 110 at step 203B. In such embodiments, the referral can be included on the paper receipt as a promotional offer code. The promotional offer code can be provided to the user 102 in a number of ways, including, for example, as a photo, a scanned image, in-person hand-off, etc.

In some embodiments, the first referral interface element is generated independent of the receipt. In one example, the first referral interface element is generated by the PSS for display on a website associated with the merchant. An example of such interface element is shown as component 332 within a text display 334 in a display 330 of FIG. 3B. In another example, the first referral interface element is generated by the PSS for display on a social network associated with the referrer (e.g., a hyperlink on Facebook®). An example of such interface element is shown as component 342 within a text display 344 in a display 340 of FIG. 3B. In both of the examples, the first referral interface element includes a hyperlink that redirects the first user 101 to another landing page (e.g., webpage, website, widget, etc.) that contains the input fields to submit the referrer and referee information. Examples of the landing page with the input fields are shown in the displays 400 and 410 of FIG. 4.

The referee information can be, for example, the name of the second user 102 and contact information of the second user 102. The contact information can be, for example, a telephone number. The referrer information can be, for example, the name of the first user 101 and contact information of the first user 101. In some embodiments, the referrer information can be auto-populated based on the data related to the transaction, such as the transaction data (e.g., cardholder's name) and any contact information provided by the first user 101 to receive the electronic receipt at step 204B. The contact information can be, for example, an email address, a telephone number, a device ID (of the computing device 104), etc.

At step 205, the computing device 104 sends onto the internetwork 108 a referral request message, for transmission to the PSS 110. The referral request message is generated and transmitted in response to the first user 101 submitting the referee information and/or the referrer information (e.g., via the payment service application, the mobile payment application, email, or website). The referral request message includes the information submitted by the user 101 (e.g., the referee information and/or the referrer information) and the information related to the transaction (e.g., the transaction data and/or any contact information submitted at step 201).

At step 206, the PSS 110 generates the referral by using the received information. In some embodiments, the PSS 110 determines what promotional offer to include in the referral based on the transaction data, such that the promotional offer would incentivize the user 101 to send a referral. For example, the PSS 110 can determine that the first user 101 enjoys a variety of premium coffee beans based on the items purchased in the transaction at the POS system 120. Further, the PSS 110 can access a database (e.g., user account database 516, financial account database 518, and/or transaction history database 520 of FIG. 5) to identify past transaction data associated with the payment card 106 of the user 101, and determine, for example, that the user 101 enjoys premium coffee beans from South America. Using this knowledge, the PSS 110 can generate a referral that includes a promotional offer, for example, for a free cup of coffee Y, which is a premium coffee variety from Brazil.

In some embodiments, the PSS 110 further determines an identity of the user 102 based on the referee information. Based on the contact information of the user 102, the PSS 110 can access a database (e.g., user account database 516, financial account database 518, and/or transaction history database 520 of FIG. 5) to determine if the contact information is associated with a payment card of the user 102 in a past transaction. The past transaction can be instantiated, or executed, at any POS system that is associated with the PSS 110. The PSS 110 has access to such transaction data because of the service that the payment service business enterprise provides to a variety of merchants.

For example, the user 102 has used her payment card in a past transaction with a POS system of another merchant (e.g., at an arts-and-crafts fair), where the user 102 has provided her email address to receive a receipt for that transaction. In this example, the POS system has obtained payment card information from a swipe of the payment card and has sent (e.g., via a wired or wireless communication network) such information, along with the email address, to the PSS 110 to request, e.g., for payment authorization and receipt. Upon receiving this information, the PSS 110, in addition to processing the transaction, has stored the payment card information in association with the email address of the user 102. The PSS 110 can now utilize the stored association between the email address and the payment card information to facilitate the referral process on behalf of the user 101. In some embodiments, the PSS 110 can identify whether the user 102 has a mobile payment application installed on the computing device 105, where the mobile payment application is associated with the PSS 110, similar to the mobile payment application discussed above with respect to the device 104. In such embodiments, the PSS 110 can communicate the referral to the user 102 through the mobile payment application.

At step 207, the PSS 110 sends a referral message that includes the generated referral to the user 102 (e.g., via email address, telephone number, mobile payment application ID, etc.). In some embodiments, the PSS 110 also stores the generated referral in association with at least a portion of the information related to the transaction at the POS system 120. The portion of information can include, for example, the payment card information that identifies the payment card 106 of the first user 101. The stored association between the referral and the payment card information can be used, for example, to generate a referral reward for the user 101 when the user 102 redeems the referral. For example, the PSS 110 can automatically cause a monetary amount (i.e., the referral reward) to be transferred to a payment account of the user 101 upon redemption of the promotional offer in the referral by the user 102. Other portions of information may be stored in association with the referral, for example, transaction ID, item description, name of the user 101, etc.

The association/storing can be performed in any order or concurrently with the transmission of the referral to the user 102 at step 207.

Referring back to the user 102, the computing device 105 of the user 102 receives the referral message sent by the PSS 110. In some embodiments, within the computing device 105, the referral message, sent to the email address of the user 102, is conveyed up through the various lower protocol layers to an email application, which recognizes the referral message as an email message. In some embodiments, within the computing device 105, the referral message, sent to the telephone number of the user 102, is conveyed up through the various lower protocol layers to a text messaging application, which recognizes the referral message as a text message. In some embodiments, within the computing device 105, the referral message is conveyed up through the various lower protocol layers to the mobile payment application, which recognizes the referral message as such.

The referral message includes a second referral interface element that is configured to prompt the user 102 to accept the referral (i.e., accept the promotional offer included in the referral). In some embodiments, the second referral interface element can prompt the user 102 to accept by sending an email (e.g., a reply email). In some embodiments, the second referral interface element can prompt the user 102 to accept by sending a text message (e.g., a reply text message). In some embodiments, the second referral interface element can prompt the user 102 to accept by clicking on an action button within the mobile payment application (e.g., "Accept promotional offer").

In some embodiments, the second referral interface element requires the user 102 to submit information to accept the promotional offer in the referral. In such embodiments, it is assumed that the user 102 does not have an account with the PSS 110, has not conducted a transaction at a POS system that is associated with the PSS 110, and/or has not conducted a transaction using a payment card with a card payment network that is associated with the POS system. In one example, the information required of the user 102 can include payment card information that identifies a payment card (e.g., a debit card, a credit card, etc.) of the user 102 (e.g., name on card, card number, expiration date, CVV, etc.). In another example, the information required of the user 102 can include an email address of the user 102, for example, if the referral message is sent through a social network or a website of a merchant instead of via email. In another example, the information required of the user 102 can include login information to a payment service system operated by the PSS 110, for example, to expedite the process of associating the one or more payment cards of the user 102 with the referral, in the scenario that the user 102 already has such an account with the PSS 110. In yet another example, the information can include account login information for a financial account to link the referral with the account (e.g., a Bank of America card-linked referral).

In some embodiments, the second referral interface element requires the user 102 to confirm, correct, and/or complete his/her identity information to accept the promotional offer provided in the referral. In such embodiments, the PSS 110 analyzes the information received from the user 101 (e.g., at step 205) to identify and present to the user 102 information about his/her name, and prompts the user 102 to confirm that information is correct, correct that information, and/or to submit any additional inputs to complete that information. For example, the information received from the user 101 includes a first name "John" and an email address johns@gmail.com. In this example, the second referral interface element can display "John" and prompts the missing last name and/or middle name information from the user 102. The user 102 can then complete the name information by submitting, for example, "K. Smith" for a completed name "John K. Smith." In another example, the user 101 submits a name "Johhhn Smith" and the second referral interface element can display that information to allow the user 102 to correct (e.g., to change the name to "John K. Smith"). In yet another example, the second referral interface element can display "John K. Smith" and prompting the user 102 to make any changes. In this example, the user 102 can simply confirm the name information displayed.

At step 208, the computing device 105 transmits an acceptance message from the user 102 to the PSS 110, where the acceptance message includes the submitted payment card/account information (if any). At step 209, the PSS 110 receives the acceptance message and, in response, associates the promotional offer in the referral with at least a portion of the referee information and/or the information submitted with the acceptance. For example, the PSS associates the email address of the user 102 with the promotional offer, and stores the association in a database of the PSS for use in redemption processing associated with the referral in a future transaction. In another example, the PSS 110 stores the submitted payment/card account information in association with the promotional offer. Alternatively, the PSS 110 identifies the payment/card account information of the user 102 based on the email address of the user 102, and stores the payment/card account information in association with the promotional offer.

At step 210, the merchant initiates a second payment transaction at the POS system 120 by reading card data, or payment card information, from a payment card of the second user 102 in response to a card swipe through the card reader 122. At step 211, in response to the card swipe, the POS system 120 transmits onto the internetwork 108 a second transaction approval request that includes transaction information, or transaction data, about the second transaction, for transmission to the PSS 110. The second transaction approval request can be transmitted directly to the PSS 110, or it can get routed to the PSS 110 through one or more intermediary entities, such as the acquirer 132 and/or card payment network 134 of the financial system 130. Upon receiving the transaction approval request, the PSS 110 approves the transaction. Note that for the sake of simplicity, the scenario in which the transaction is denied is not discussed here.

In response to the transaction being approved, the PSS 110 performs for the user 102 at least the operations discussed above with respect to steps 203A and 204A. In some embodiments, the PSS 110 can further perform an operation to determine whether the customer has requested a redemption of a promotional offer. In such embodiments, the PSS 110 detects if there exists an indication of a redemption request from the customer.

In some embodiments, the indication of a redemption request can be detected based on the payment card information included in the transaction data. In some embodiments, the PSS 110 utilizes the payment card information to perform a database lookup for identifying whether the customer is the user 102. In such embodiments, the PSS 110 looks for the email address that is associated with the payment card identified by the payment card information. Upon identifying that the email address is the email address of the user 102, the PSS 110 identifies whether there is a referral associated with that email address. In particular, the PSS 110 can identify the referral based on the previously stored association between the referral and the email address of the user 102. In response to the identification of the referral, the PSS 110 causes execution of a redemption process for the promotional offer included in the referral.

In some embodiments, the PSS 110 identifies the user 102 by using fuzzy logic to correlate the payment card information (received in the second transaction) with the referee information (received from the first user 101). For example, if the PSS 110 identifies a match in the name of the cardholder and the name included in the referee information, the PSS 110 is able to verify that the customer in the second transaction is indeed the second user 102 who has accepted the referral (in step 208). Note that the term "match" as used here may not necessarily require an exact match. In some embodiments, the PSS 110 maintains a list of names of all referrers that have been identified and/or submitted, by one or more referrers, to the POS system 120 (e.g., at step 205). In such embodiments, the PSS 110 can perform fuzzy logic matching between the name extracted from the payment card information and the one or more names included in the list associated with the POS system 120. In some embodiments, the PSS 110 associates the list of names with a particular location of a particular merchant. For example, the PSS 110 can associate the list of names with a coffee shop's location in Palo Alto, Calif., where that coffee shop is part of a national franchise of coffee shops operated by a coffee shop merchant (e.g., coffee shop person or company). In some embodiments, the PSS 110 associates the list of names with a particular merchant, regardless of location. For example, the PSS 110 can associate the list of names with a coffee shop merchant, where a promotional offer in a referral can be redeemed at any coffee shop operated by that coffee shop merchant. In some embodiments, the list of names is maintained by the POS system 120 and transmitted to the PSS 110 for processing the redemption of the promotional offers included in referrals.

In some embodiments, the PSS 110 utilizes the payment card information to identify additional information about the cardholder (i.e., the customer in the second transaction), such as an email address or a telephone number. Using this additional information, the PSS 110 can improve its use of fuzzy logic to identify the user 102 and/or the referral. Upon verification of the user 102 (and the referral), the PSS 110 causes execution of a redemption processing of the promotional offer included in the referral.

In some embodiments, the PSS 110 detects the indication of a redemption request by receiving a promotional offer code from the POS system 120. In some embodiments, the PSS 110 detects the indication of the redemption request by detecting a promotional offer code from the transaction data (associated with the second transaction) that has been received from the POS system 120. The promotional offer code is associated with the promotional offer included in the referral. In some embodiments, the promotional offer code is obtained via a scan at the POS system 120, and transmitted onto the internetwork 108, via the payment service application installed on the POS system 120, to the PSS 110. In some embodiments, the promotional offer code is obtained via a scan at the POS system 120, and transmitted to the PSS 110 through an upload via an online portal associated with the PSS 110 (e.g., a web interface of a website hosted by the PSS 110). Upon receiving the promotional offer code, the PSS 110 performs a database lookup to identify a referral that includes a promotional offer having the promotional offer code. Upon identification of such referral, the PSS 110 causes execution of a redemption processing of the promotional offer.

In some embodiments, execution of the redemption process involves the PSS 110 communicating the identification of the referral to the POS system 120 (e.g., by communicating with the payment service application installed thereon). The POS system 120, in turn, applies a deduction to the transaction amount of the second transaction for the user 102, as indicated by step 212A.

In some embodiments, execution of the redemption process occurs post-transaction, where the PSS 110 communicates with the financial system 130 to cause an amount to be credited back into a payment account of the payment card of the user 102, as indicated by step 212B. In some embodiments, the amount can be transferred from a payment account of the PSS 110 to the payment account associated with the payment card of the user 102. In some embodiments, the amount can be transferred from a payment account of the merchant to the payment account associated with the payment card of the user 102.

In some embodiments, execution of the redemption process occurs post-transaction, where the PSS 110 communicates with the financial system 130 to void and/or edit a payment authorization request associated with the payment card of the user 102. In particular, the PSS transmits a request to edit the amount (e.g., void or reduce the requested amount) in the already submitted payment authorization request (e.g., as discussed in step 203A).

In some embodiments, the redemption process occurs post-transaction based on an initiation of the second user 102. For example, the second user 102 receives an electronic receipt for the second transaction with the merchant, where the electronic receipt is generated and sent by the PSS 110. In such receipt, the second user 102 is notified of the referral with a message prompting the second user 102 to redeem the promotional offer included in the referral (e.g., "Make cup of Coffee Y free!"). The notification can be a third referral interface element that, upon being activated, causes the referral to be applied to the second transaction. In some embodiments, upon receiving an indication that the second user 102 wishes to apply the referral (i.e., an indication of a redemption request by the second user 102) (e.g., a click on a link or button displayed by the third referral interface element), the PSS 110 communicates with the financial system 130 associated with the payment card of the user 102 to cause an amount to be credited back into a payment account of that payment card.

Regarding the process of FIG. 2, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples: alternative implementations can employ differing values or ranges.

Figure 5:
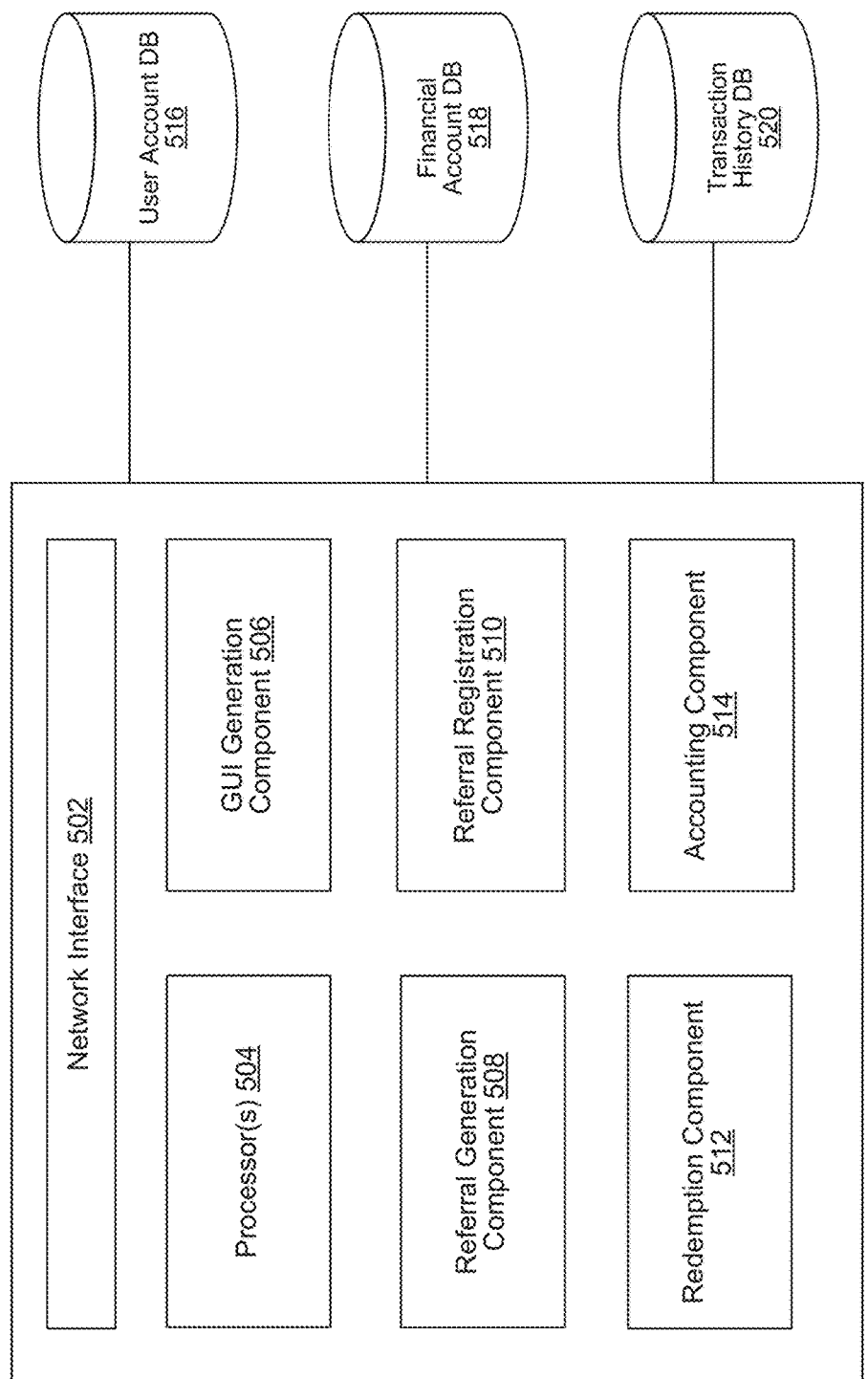
FIG. 5 is a block diagram showing components of a payment service system for implementing the referral technology.

FIG. 5 is a block diagram of components of a payment service system 500 for implementing the referral technology. In some embodiments, the payment service system 500 (hereinafter, "PSS 500") can be a component or sub-system of the PSS 110. Alternately, the PSS 110 can be implemented on a separate computing system (e.g., on a separate server or servers). In some embodiments, the PSS 500 can be the PSS 110. The PSS 500 includes a network interface 502, one or more processors 504, a graphical user interface (GUI) generation component 506, a referral generation component 508, a referral registration component 510, a redemption component 512, and an accounting component 514. In some embodiments, the PSS 500 also includes a user account database 516 (hereinafter, "DB 516"), a financial account database 518 (hereinafter, "DB 518"), and a transaction history database 520 (hereinafter, "DB 520").

The referral generation component 508 is triggered whenever the PSS 500 receives (e.g., via the network interface 502) an indication of a transaction executed at a merchant's POS system. In some embodiments, the indication can be received from the POS system itself (e.g., via a payment service application associated with the PSS 500). In some embodiments, the indication can be received from a card payment network (e.g., Visa®, MasterCard®, Amex®, etc.). In such embodiments, the card payment network and the payment service business enterprise (that employs the PSS 500) can pre-establish a business relationship that involves their mutually shared customers. Based on this relationship, the PSS 500 sends a list of payment cards of its customers to a computer system of the card payment network for storage in a whitelist database. When a transaction is initiated at a POS system using a card supplied by the card payment network, the computer system of the card payment network receives the transaction data and payment authorization request for that transaction, and immediately determines whether the card is identified in the whitelist database. If the whitelist database includes a payment account associated with the card, the computer system of the card payment network transmits the indication of the transaction to the PSS 500.

In some embodiments, the indication (sent from either the POS system or the computer system of the card payment network) includes information related to the transaction, including the transaction information and any other information received from the customer in the transaction, such as contact information (e.g., telephone number) at which to receive a receipt for the transaction. Based on this transaction data, the referral generation component 508 of the PSS 500 initiates the process to generate the referral (e.g., prompts a referrer to submit referee information, generates the referral, and sends the referral to the referee).

The referral registration component 510 facilitates the registration of the referral to the referrer and the referee. That is, the referral registration component 510 stores the referral in association with the referrer and in association with the referee, respectively. In particular, upon the referrer's submission of the referee information (and/or referrer information) to the PSS 500, the referral registration component 510 stores the referral in association with at least a portion of the information related to the transaction between the referrer and the merchant (e.g., referrer's payment card information, referrer's contact information (e.g., telephone number), transaction ID, item description, etc.). Such storing of the association constitutes a "registration" of the referrer to the referral. Further, upon the referee's acceptance of the promotional offer (and essentially the referral), the referral registration component 510 stores the referral in association with the referee information (e.g., telephone number) and/or the referee's payment card information. Such storing of the association constitutes a "registration" of the referee to the referral.

The redemption component 512 facilitates the redemption processing of the promotional offer included in the referral. The redemption component 512 is triggered whenever the PSS 500 receives (e.g., via the network interface 502) an indication of a transaction executed at a merchant's POS system. As discussed above, the PSS 500 can receive the indication from the POS system itself or from the computer system of the card payment network, where the indication includes, among others, transaction information.

In some embodiments, where the indication is received from the POS system, the redemption component 512, upon identifying the customer has registered for a referral (i.e., accepted the promotional offer included in the referral), causes an amount to be deducted from the transaction amount charged for the transaction, where the amount is indicative of a promotional offer value associated with the referral. In particular, the redemption component 512 first checks one or more database tables (e.g., DB 516, DB 518, and/or DB 520) to determine whether the customer associated with the transaction has registered for a referral. For example, if the customer's payment card information already exists in the database, and it is associated with an email address that is associated with a referral in the database, then the promotional offer included in that referral will be applied. If, for example, the payment card information does not exist in the database, the redemption component 512 does not alert the POS system of any referral (i.e., the process ends).

In some embodiments, the redemption component 512 performs an additional step to determine referral registration based on fuzzy logic, even if the payment card information does not exist in the database. In such embodiments, the redemption component 512 correlates information included in the information received from the POS system with the referee information provided by the referrer. For example, the redemption component 512 determines if a cardholder name (from the transaction information) matches the name of the referee (from the referee information). In another example, the redemption component 512 determines if the customer's email address (provided to receive a receipt) matches the email address of the referee (from the referee information). If a match is found, the redemption component 512 causes the deduction to take place at the POS system. Note that the term "match" as used here may not necessarily require an exact match.

Upon identification of the referral, the redemption component 512 notifies the accounting component 514. The accounting component 514, via the network interface 502, communicates with the payment service application installed on the POS system to cause the deduction (indicative of the promotional value) to be applied at the POS system.

In some embodiments, where the indication is received from the POS system, the redemption component 512 applies the promotional value post-transaction. In such embodiments, the redemption component 512, upon identification of the referral, notifies the accounting component 514, which, in turn, communicates with a financial system associated with the payment card of the identified referee. In particular, the accounting component 514 transmits (e.g., via the network interface 502 over a wired or wireless communication network) a request to the financial system to credit a financial/payment account associated with the payment card with an amount indicative of the promotional value. In some embodiments, the accounting component 514 communicates with the financial system to request a void and/or an edit of the transaction amount included in the payment authorization request sent for the transaction, where the void and/or edited amount is indicative of the promotional value.

In some embodiments, where the indication is received from the card payment network, the PSS 500 can periodically send a list of payment cards of customers that have accepted referrals generated by the PSS 500. Whenever a transaction is initiated at a POS system using a card that is on the list of payment cards, the computer system of the card payment network, which receives the payment authorization request for that transaction, forwards to the PSS 500 the transaction information along with a message indicating the payment card is associated with a referral (as indicated by the database). Upon receiving the message, the redemption component 512 notifies the accounting component 514. The accounting component 514 communicates with a financial system associated with the payment card of the identified referee to request an amount indicative of the promotional value to be credited back to a financial/payment account associated with the payment card. In some embodiments, the accounting component 514 communicates with the financial system to request a void and/or an edit of the transaction amount included in the payment authorization request sent for the transaction.

The graphical user interface (GUI) generation component 506 generates one or more GUI screens that allow for interface with a user, such as a merchant or a customer (e.g., user 101 or 102 of FIG. 1). In some embodiments, the GUI generation component 506 generates the first, second, and third referral interfaces for facilitating referrals.

FIG. 6 illustrates an example of database tables 602, 604, 606 that are maintained by a payment service system (e.g., PSS 110 of FIG. 1) to facilitate a referral, in accordance with some embodiments. The payment service system can access one or more of the database tables 602, 604, 606 to retrieve and/or store data associated with one or more referrals. In some embodiments, the database tables 602, 604, 606 can be stored in one or more of the databases 516, 518, and 520 of FIG. 5.

The database table 602 can store various fields of information such as a referral identifier (ID), one or more customer identifiers (IDs) (e.g., email address, phone number, device identifier, mobile application identifier, etc.), a customer name, billing address, and/or the like. The database table 604 can include various fields of information such as a customer identifier, a payment card/account number (e.g., primary account number or PAN), an issuer, an expiration date, a billing address, a card/account type, and/or the like. The database table 606 can include various fields of information such as a transaction identifier, customer identifier, date, merchant name, amount, product/service item names/codes, and/or the like. Various other database tables may also be accessed by the payment service system.

Figure 7:
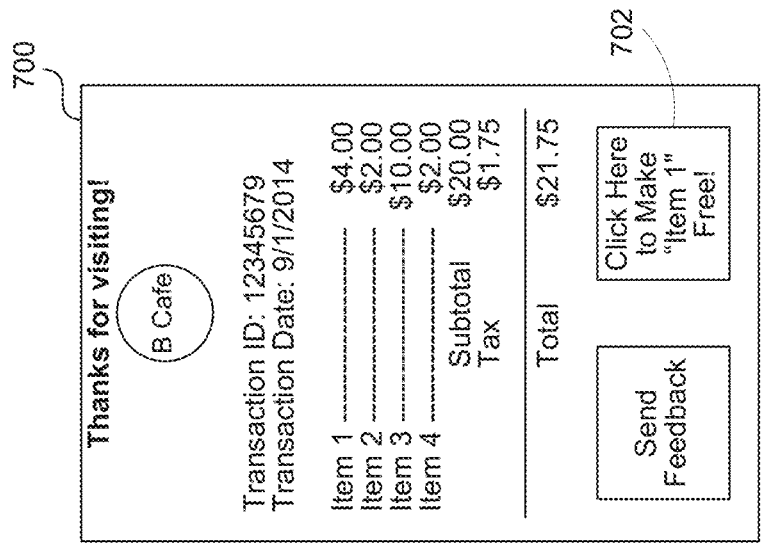
FIG. 7 illustrates an example of a screen display that can be generated by a referee's computing device to enable redemption of a referral.

FIG. 7 illustrates an example of a screen display 700 that can be generated by a referee's computing device (e.g., computing device 105 of FIG. 1) to enable redemption of a referral, in accordance with some embodiments. The display 700 presents to the referee transaction information of a transaction at "B Café," along with a component 702 that enables the referee to redeem an item purchased in that transaction. For example, the component 702 can display a message "Click Here to Make 'Item 1' Free!" The "free" item can be a promotion included in a referral sent to the referee from a referrer and accepted by the referee. The referee can select or "click" the component 702 to indicate he/she wishes to apply the "free" promotion.

Figure 8:
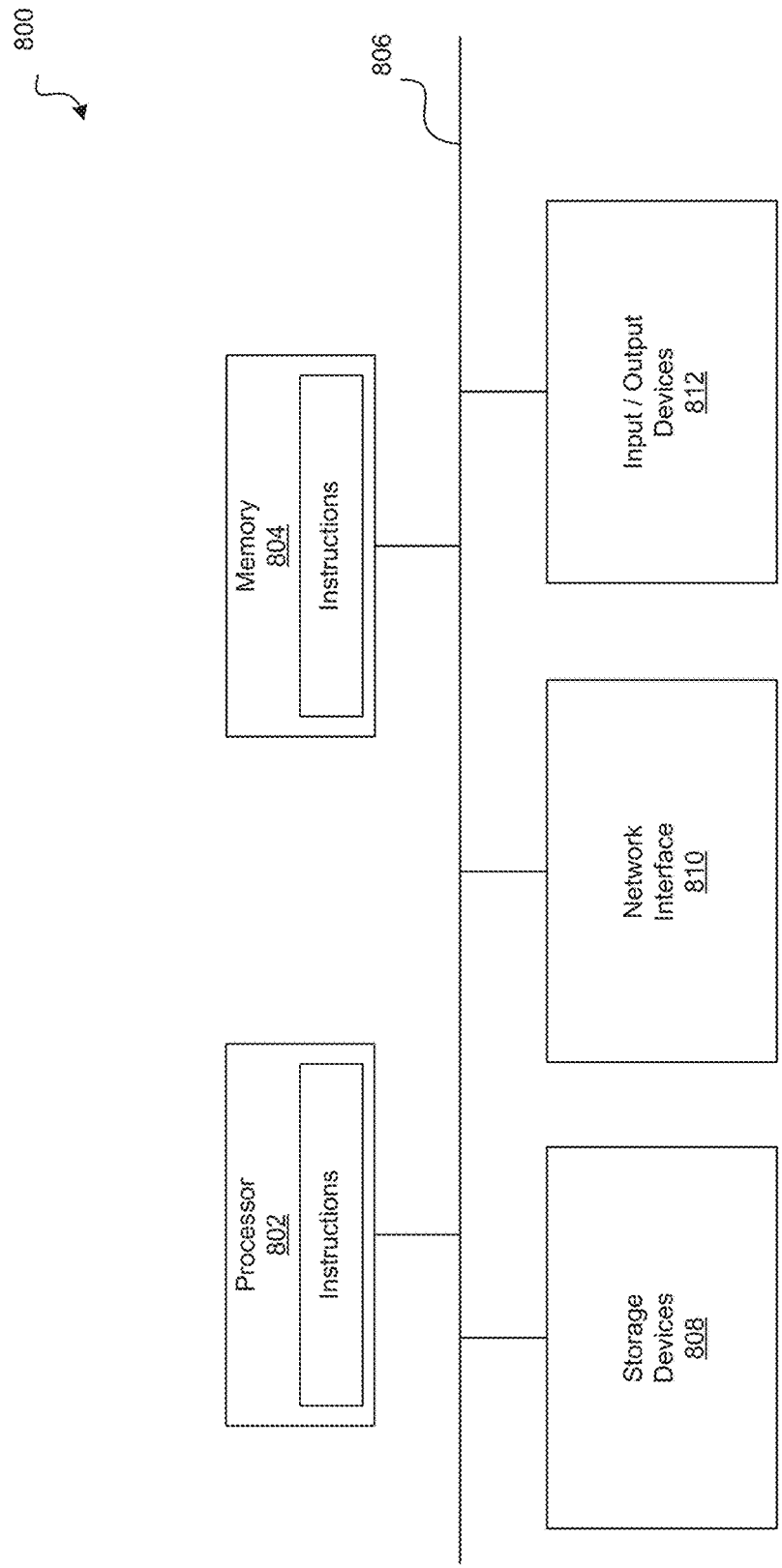
FIG. 8 is a high-level block diagram of a computer system as can be used to implement features of at least some embodiments of the referral technology.

FIG. 8 is a block diagram of a computer system as may be used to implement features of some of the embodiments. The computing system 800 may include one or more central processing units ("processors") 802, memory 804, input/output devices 812 (e.g., keyboard and pointing devices, display devices), storage devices 808 (e.g., disk drives), and network interface 810 that is connected to an interconnect 806. The interconnect 806 is illustrated as an abstraction that represents any one or more separate physical buses, point to point connections, or both connected by appropriate bridges, adapters, or controllers.

The memory 804 and storage devices 808 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 804 can be implemented as software and/or firmware to program the processor(s) 802 to carry out actions described above. In some embodiments, such software or firmware may be initially provided to the processing system 800 by downloading it from a remote system through the computing system 800 (e.g., via network interface 810).

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software used to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure. Further, although the referral technology has been described with reference to specific exemplary embodiments, it will be recognized that the referral technology is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system comprising:
   one or more processors;

a networking interface to communicate with:
  a first point-of-sale (POS) system associated with a first merchant, the first POS system including a payment instrument reader device, and
  a second POS system associated with a second merchant; and
a storage device storing instructions that, when executed by the one or more processors, configure the system to perform operations comprising:
  receiving, via the networking interface from the first POS device, first transaction information including an indication of a first product and first payment card information collected by the payment instrument reader;
  receiving an acceptance message indicating a promotional offer for a second product associated with the first product;
  generating first data associating, at least partly in response to receiving the acceptance message, the first payment card information with the promotional offer for the second product;
  receiving, via the networking interface from the second POS device, second transaction information including an indication of the second product and the first payment card information;
  generating, based at least in part on the first data associating the first payment card information with the promotional offer for the second product, second data indicating that the second transaction information includes the indication of the second product; and
  transmitting, based at least in part on the second data and via the networking interface to the second POS device, instructions to apply a deduction to a transaction amount associated with second product included in the second transaction information, the instructions causing an application associated with the second POS device to apply the deduction.

2. The system as claim 1 recites, wherein:
the acceptance message further indicates contact information; and
the operations further comprise:
  transmitting, based at least in part on the contact information, a first receipt to a first customer device associated with a first customer, the first receipt indicating at least some of the first transaction information; and
  transmitting, based at least in part on the contact information, a second receipt to the first customer device associated with the first customer, the second receipt indicating at least some of the second transaction information.

3. The system as claim 1 recites, wherein:
the acceptance message further indicates recipient information; and
the operations further comprise:
  transmitting, based at least in part on the recipient information, an indication of the promotional offer to a second customer device associated with a second customer;
  receiving a second acceptance from the second customer device, the second acceptance indicating the promotional offer and including second payment card information;
  associating, at least partly in response to receiving the acceptance message, the second payment card information with the promotional offer;
  receiving, via the networking interface from the first POS device or the second POS device, third transaction information including the second payment card information; and
  transmitting, based at least in part on determining that the second payment card information and the third transaction information is associated with the promotional offer and via the networking interface to the first POS device or the second POS device, instructions to apply the deduction to a second transaction amount associated with the third transaction information.

4. The system as claim 3 recites, wherein the operations further comprise determining, at least partly in response to determining that the third transaction information is associated with the promotional offer, that a first user, associated with the first payment card information, referred the promotional offer to a second user, associated with the second payment card information.

5. The system as claim 4 recites, wherein the operations further comprise:
  associating a referral payment amount with the first payment card information;
  receiving fourth transaction data, via the networking interface from the first POS device or the second POS device, fourth transaction information including the first payment card information; and
  transmitting, via the network interface to the first POS device or the second POS device, instructions to apply the referral payment amount to the further transaction data.

6. A non-transitory computer-readable medium storing computer-executable instructions that, when executed by one or more processors, cause the one or more processors to:
  receive, from a first POS device that includes a payment card reader, first transaction information including an indication of a first item, wherein the first POS device is associated with a first merchant;
  receive, from the first POS device or a first user device, a first acceptance indicating a promotional offer for the first item or a second item associated with the first item and recipient information associated with a second user;
  generate first data associating, based at least in part on receiving the first acceptance, the promotional offer with at least a portion of the first transaction information associated with the first item;
  transmit, to a second user device associated with the second user and based at least in part on receiving the recipient information, a referral message indicating the promotional offer;
  receive, from the second user device, a second acceptance;
  generate second data associating, based at least in part on receiving the second acceptance, the promotional offer with the recipient information;
  receive, from the first POS device or a second POS device associated with a second merchant, second transaction information including an indication of the first item or the second item;
  determine that the second transaction information corresponds to the portion of the first transaction information associated with the first item or at least a portion of the recipient information; and
  transmit, based at least in part on the determining and to the first POS device or the second POS device, instructions to apply a deduction associated with the promotional offer to a transaction amount associated with the first item or the second item included in the second transaction information before execution of the second transaction is completed, the instructions causing an application associated with the first POS device or the second POS device to apply the deduction.

7. The non-transitory computer-readable medium as claim 6 recites, wherein:
    the second acceptance indicates second payment card information;
    the second transaction information includes at least the portion of the recipient information; and
    the instructions further cause the one or more processors to transmit, to the first POS device or the second POS device and based at least in part on the determining, the second payment card information and instructions to process the transaction amount, less the deduction, using the second payment card information.

8. The non-transitory computer-readable medium as claim 7 recites, wherein the instructions further cause the one or more processors to:
    determine, based at least in part on determining that the second transaction information corresponds to the portion of the recipient information, that the first user referred the second user; and
    associate, based at least in part on the first user referring the second user, a payment credit with the first payment card information.

9. The non-transitory computer-readable medium as claim 7 recites, wherein the instructions further cause the one or more processors to:
    receive, from the first POS device or the second POS device, third transaction data;
    determine that third transaction data is associated with the first user; and
    transmit, to the first POS device or the second POS device, instructions to apply the payment credit to a transaction amount associated with the third transaction data.

10. The non-transitory computer-readable medium as claim 6 recites, the instructions further cause the one or more processors to:
    receive, from the first POS device or the first user device, contact information associated with the first user; and
    store the contact information in association with the first payment card information.

11. The non-transitory computer-readable medium as claim 10 recites, wherein:
    the second transaction information is received from the second POS device associated with the second merchant;
    the instructions further cause the one or more processors to:
        determine that the second transaction information indicates at least part of the contact information associated with the first user; and
        transmit, to the second POS device and based at least in part on the determining that the second transaction information indicates at least part of the contact information, the first payment card information and instructions to process the transaction amount, less the deduction, using the first payment card information.

12. The non-transitory computer-readable medium as claim 6 recites, wherein the instructions further cause the one or more processors to generate and transmit an electronic receipt to the first user device, the electronic receipt being associated with the first transaction information and including a first interface element, wherein:
    the first interface element is configured to cause the first user device to prompt the first user to input the recipient information to transmit a referral message to the second user device, and
    the receiving the acceptance is based at least in part on activation of the first interface element.

13. A computer-implemented method comprising:
    receiving, by a server computer operated as part of a payment service system (PSS), via a computer network, from a first point-of-sale (POS) system associated with a first merchant, first transaction information associated with a first transaction executed at the first POS system between a first user and the first merchant and indicating first payment card information, the first POS system associated with a first card reader device at a physical location of the first merchant;
    receiving, by the server computer via the computer network, contact information associated with the first user;
    generating first data associating the contact information with the first payment card information;
    receiving, by the server computer via the computer network from a second POS system associated with a second merchant at a second physical location, second transaction information associated with a second transaction executed at the second POS system;
    determining, based at least in part on the first data, that the second transaction information is associated with the first user; and
    transmitting, to the second POS system via the computer network and based at least in part on determining that the second transaction information is associated with the first user, the first payment card information and instructions to process the second transaction using the first payment card information, the instructions causing an application of the second POS system to process the second transaction using the first payment card information.

14. The computer-implemented method as claim 13 recites, further comprising:
    transmitting, via the computer network to a first user device of the first user and based at least in part on the contact information, a first electronic receipt indicating at least part of the first transaction information and a second electronic receipt indicating at least part of the second transaction information.

15. The computer-implemented method as claim 13 recites, further comprising:
    transmitting, via the computer network to a first user device of the first user and based at least in part on the contact information, a first electronic receipt indicating at least part of the first transaction information and including a first interface element, wherein:
        the first interface element is configured to cause the first user device to prompt the first user to select a promotional offer from among multiple promotional offers and input recipient information to transmit a referral message to a second user device, and
        the receiving the acceptance is based at least in part on activation of the first interface element.

16. The computer-implemented method as claim 15 recites, further comprising:
    receiving, by the server computer via the computer network from the first user device, a selection of the promotional offer and the recipient information.

17. The computer-implemented method as claim 16 recites, further comprising:
  associating the first payment card information with the promotional offer; and
  wherein:
    determining that the second transaction information is associated with the first user further includes that the promotional offer is available to the first user, and
    transmitting the instructions includes transmitting transactions to apply a deduction associated with the promotional offer to the first transaction.

18. The computer-implemented method as claim 16 recites, further comprising:
  generating, by the server computer, and transmitting, via the computer network and based at least in part on receiving the recipient information, to a second user device of a second user, an indication of the promotional offer;
  receiving, by the server computer and from the second device via the computer network, an acceptance of the promotional offer and second payment information;
  receiving, by the server computer via the computer network from the first payment service application or the second POS system, third payment information associated with a third transaction executed at the first POS system or the second POS system;
  determining that the third transaction information is associated with the second user;
  transmitting, to the first POS system or the second POS system via the computer network and based at least in part on determining that the second transaction information is associated with the second user, the second payment card information and instructions to process the third transaction using the first payment card information after applying the deduction to the third transaction.

19. The computer-implemented method as claim 18 recites, further comprising:
  determining, based at least in part on determining that the third transaction information is associated with the second user, that the first user referred the second user; and
  associating, based at least in part on the first user referring the second user, a payment credit with the first payment card information.

20. The computer-implemented method as claim 18 recites, wherein determining that the third transaction information is associated with the second user includes determining that the transaction information includes at least part of the recipient information.

* * * * *